United States Patent
Miyashita et al.

(10) Patent No.: US 8,179,539 B2
(45) Date of Patent: May 15, 2012

(54) PRINTING APPARATUS AND PRINT PATTERN SETTING DEVICE

(75) Inventors: Tomoki Miyashita, Nagoya (JP); Hidekazu Ishii, Aisai (JP); Yoshitsugu Tomomatsu, Nagoya (JP); Akihiko Niwa, Toki (JP); Yuji Iida, Chita (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 1027 days.

(21) Appl. No.: 12/072,587

(22) Filed: Feb. 27, 2008

(65) Prior Publication Data

US 2008/0204809 A1 Aug. 28, 2008

(30) Foreign Application Priority Data

Feb. 27, 2007 (JP) ................................. 2007-047110
Mar. 22, 2007 (JP) ................................. 2007-075335

(51) Int. Cl.
*G06F 15/00* (2006.01)
*G06F 3/12* (2006.01)
*G06K 1/00* (2006.01)

(52) U.S. Cl. ...................................... 358/1.13; 358/1.15

(58) Field of Classification Search .......................... None
See application file for complete search history.

(56) References Cited

U.S. PATENT DOCUMENTS

| 2004/0118908 | A1* | 6/2004 | Ando et al. .................. 235/375 |
| 2007/0038929 | A1 | 2/2007 | Miyazawa | |

FOREIGN PATENT DOCUMENTS

| EP | 1 566 742 | 8/2005 |
| JP | 5199990 | 8/1993 |
| JP | 5303476 | 11/1993 |
| JP | 2004330688 | 11/2004 |

OTHER PUBLICATIONS

"A Web Agent for Automating E-Commerce Operations"; Juan Raposo, et al.; E-Commerce, 2003; CEC 2003, IEEE International Conference on Jun. 24-27, 2003, pp. 16-19; XP010643743.
"A Machine-Learning Apprentice For The Completion Of Repetitive Forms"; Leonard Hermens et al.; Proceedings of The Conference On Artificial Intelligence For Applications; Mar. 1-5, 1993; IEEE Comp. Soc. Press; vol. CONF. 9; pp. 164-170; XP010125560.

* cited by examiner

*Primary Examiner* — Douglas Tran
(74) *Attorney, Agent, or Firm* — Day Pitney LLP

(57) ABSTRACT

When a print pattern setting mode is set and a printing apparatus receives print data including object print data from an external device, all arrangement patterns where the object print data is located in each printing areas defined in template data are produced. A setting capability checking process is executed for each arrangement pattern. Preview data is produced for the arrangement patterns where all the object print data can be printed and displayed on a liquid crystal display. When preview data displayed on the liquid crystal display is selected, the arrangement pattern corresponding to the preview data is set to the template data.

23 Claims, 22 Drawing Sheets

| RECEIVED DATA | |
|---|---|
| OBJECT PRINT DATA (1) | Pencil |
| OBJECT PRINT DATA (2) | 2006.10.30 |
| OBJECT PRINT DATA (3) | 012345 |

FIG. 7

| ARRANGEMENT PATTERN (1) ||
|---|---|
| PRINTING AREA | OBJECT PRINT DATA |
| PRINTING AREA (A) | OBJECT PRINT DATA (1) |
| PRINTING AREA (B) | OBJECT PRINT DATA (2) |
| PRINTING AREA (C) | OBJECT PRINT DATA (3) |

| ARRANGEMENT PATTERN (2) ||
|---|---|
| PRINTING AREA | OBJECT PRINT DATA |
| PRINTING AREA (A) | OBJECT PRINT DATA (1) |
| PRINTING AREA (B) | OBJECT PRINT DATA (3) |
| PRINTING AREA (C) | OBJECT PRINT DATA (2) |

| ARRANGEMENT PATTERN (3) ||
|---|---|
| PRINTING AREA | OBJECT PRINT DATA |
| PRINTING AREA (A) | OBJECT PRINT DATA (2) |
| PRINTING AREA (B) | OBJECT PRINT DATA (1) |
| PRINTING AREA (C) | OBJECT PRINT DATA (3) |

| ARRANGEMENT PATTERN (4) ||
|---|---|
| PRINTING AREA | OBJECT PRINT DATA |
| PRINTING AREA (A) | OBJECT PRINT DATA (2) |
| PRINTING AREA (B) | OBJECT PRINT DATA (3) |
| PRINTING AREA (C) | OBJECT PRINT DATA (1) |

| ARRANGEMENT PATTERN (5) ||
|---|---|
| PRINTING AREA | OBJECT PRINT DATA |
| PRINTING AREA (A) | OBJECT PRINT DATA (3) |
| PRINTING AREA (B) | OBJECT PRINT DATA (1) |
| PRINTING AREA (C) | OBJECT PRINT DATA (2) |

| ARRANGEMENT PATTERN (6) ||
|---|---|
| PRINTING AREA | OBJECT PRINT DATA |
| PRINTING AREA (A) | OBJECT PRINT DATA (3) |
| PRINTING AREA (B) | OBJECT PRINT DATA (2) |
| PRINTING AREA (C) | OBJECT PRINT DATA (1) |

| DATE | 2006.12.25 |
|---|---|
| TIME | 9:30 |
| PERSON(S) | 3 |
| WAIT TIME | APPROX.12 MIN. |

1061B

| BEEF | 2006.12.25 | g |
|---|---|---|
| PORK | 9:30 | g |
| CHICKEN | 3 | g |
| TOTAL | 12 YEN | |

1061C

| Name | : 2006.12.25 |
|---|---|
| Company | : 9:30 |
| Age | : 3 |
| Weight | : 12 |

PRINTING APPARATUS AND PRINT PATTERN SETTING DEVICE

CROSS-REFERENCE TO RELATED APPLICATION

This application claims priority from JP 2007-047110, filed Feb. 27, 2007 and JP 2007-075335, filed Mar. 22, 2007, the content of which are hereby incorporated by reference their entirety.

TECHNICAL FIELD

The disclosure relates to a printing apparatus for printing a template where received data is input.

BACKGROUND

Conventionally, when a printing apparatus receives received data including object print data, each of the object print data is located at a predetermined printing area. In a state where each object print data is located at a predetermined printing area, the printing apparatus prints the object print data on a printing medium. Such a printing apparatus is disclosed in Japanese Patent Application Laid-open No. 5-303476.

In the printing apparatus disclosed in Japanese Patent Application Laid-open No. 5-303476, form definition data (that is template data) which defines a plurality of fields (that are printing areas) is stored in storing means. An identification number which identifies each field is applied to each field which is defined by form definition data.

When the received data (that is object print data) which is to be printed in each field is transmitted, data representing a field where the received data is to be located is applied to the received data so as to specify one field.

Accordingly, based on the data applied to each received data and the identification number of each field, the received data is located in the specified field. Therefore, the printing apparatus disclosed in Japanese Patent Application Laid-open No. 5-303476 provides a printed matter where each received data is located in a desired arrangement.

However, in the printing apparatus disclosed in Japanese Patent Application Laid-open No. 5-303476, as described above, the identification number is applied to each field of the form definition data. Therefore, data for specifying the field should be applied to each received data so as to locate each received data in a desired field. At this time, data which is applied to each received data necessarily specifies a field which is desired by a user.

In this case, in the printing apparatus disclosed in Japanese Patent Application Laid-open No. 5-303476, a user needs to know the identification number of each field which is defined by the form definition data and a user needs to apply data for specifying a field to each received data based on the known identification number. In other words, in the printing apparatus disclosed in Japanese Patent Application Laid-open No. 5-303476, quite complicated confirming operation and setting operation needs to be performed so as to obtain a desired printed matter.

In the printing apparatus disclosed in Japanese Patent Application Laid-open No. 5-303476, the data for specifying a field can be applied to the received data. However, there has been an apparatus which sends only received data. Since such an inexpensive apparatus with low quality function simply sends the received data, the data for specifying a field cannot be applied to the received data like the printing apparatus disclosed in Japanese Patent Application Laid-open No. 5-303476.

Such an apparatus is used for a printing apparatus disclosed in Japanese Patent Application Laid-open No. 5-303476, each received data is sent without specifying a field where the received data is to be located. Therefore, the arrangement style of each received data is not to be an arrangement style that is desired by a user. In other words, in this case, even a printing apparatus disclosed in Japanese Patent Application Laid-open No. 5-303476 does not provide a user with a desired printed matter.

Further, conventionally, when a printing apparatus receives data from a host apparatus such as a scale, a bar code reader, a medical equipment and the like, item data included in the received data is input to each input item of a template and printed in the printing apparatus. The data received from the host apparatus includes item data, a delimiter, a print start data and the like. Therefore, a user preliminary registered a delimiter character, a print start data and the like which are used by the host apparatus such that the printing apparatus automatically analyzes the item data, a delimiter, a print start data and the like based on the data received from the host apparatus. After such initial setting has been performed, the printing apparatus automatically analyzes the item data, the delimiter, the print start data included in the received data whenever the printing apparatus receives data from the host apparatus. Therefore, the template where the item data included in the received data has been input to the input items can be set to be in an appropriate state.

Japanese Patent Application Laid-open No. 5-199990 and Japanese Patent Application Laid-open No. 2004-330688 disclose a printing apparatus which automatically analyzes data received from a host computer.

However, if a configuration of data received from the host apparatus is unknown to the user, it is difficult for the user to preliminary register a delimiter character, a print start data and the like which are used by the host apparatus. Therefore, even if the printing apparatus receives data from the host apparatus, the item data, the delimiter or the print start data included in the received data cannot be identified correctly. Thus, the template where the item data included in the received data has been input to the input items cannot be set to be in an appropriate state.

Further, if the printing apparatus has a plurality of templates, the user preliminary needs to select a template where the received data from the host apparatus can be input in an appropriate state. The user needs to know all the templates included in the printing apparatus to select an appropriate template. Therefore, if the number of templates included in the printing apparatus becomes larger, it is difficult for a user to search and select a template where the received data from the host apparatus can be input in an appropriate state.

SUMMARY

The disclosure has been made in view of the above circumstances and has an object to overcome the above problems and to provide a printing apparatus which displays a print image of a template where received data is input such that a user can preview a print image of the template.

To achieve the purpose of the disclosure, there is provided a printing apparatus comprising: a template storing device that stores a plurality of templates; a receiving device that receives received data; a printing device that prints print data which is produced by inputting the received data to one of the plurality of templates; and a displaying device that displays a print image of the print data.

BRIEF DESCRIPTION OF THE DRAWINGS

FIG. 7 is a view showing an example of an arrangement pattern based on each printing area and each object print data;

FIG. 11 is a view showing an example of a print preview displayed by the printing apparatus according to the third embodiment;

DETAILED DESCRIPTION

A detailed description of an exemplary embodiment of a printing apparatus of the disclosure will now be given referring to the accompanying drawings.

[First Embodiment]

First, a configuration of a printing apparatus 1 according to a first embodiment will be explained in details with reference to the drawings.

The printing apparatus 1 according to the first embodiment receives received data from an external device 100. The received data includes object print data. The printing apparatus 1 locates the object print data in a printing area to print the object print data on a printing medium (not shown). The printing area is defined in template data which will be described later.

Figure 1:
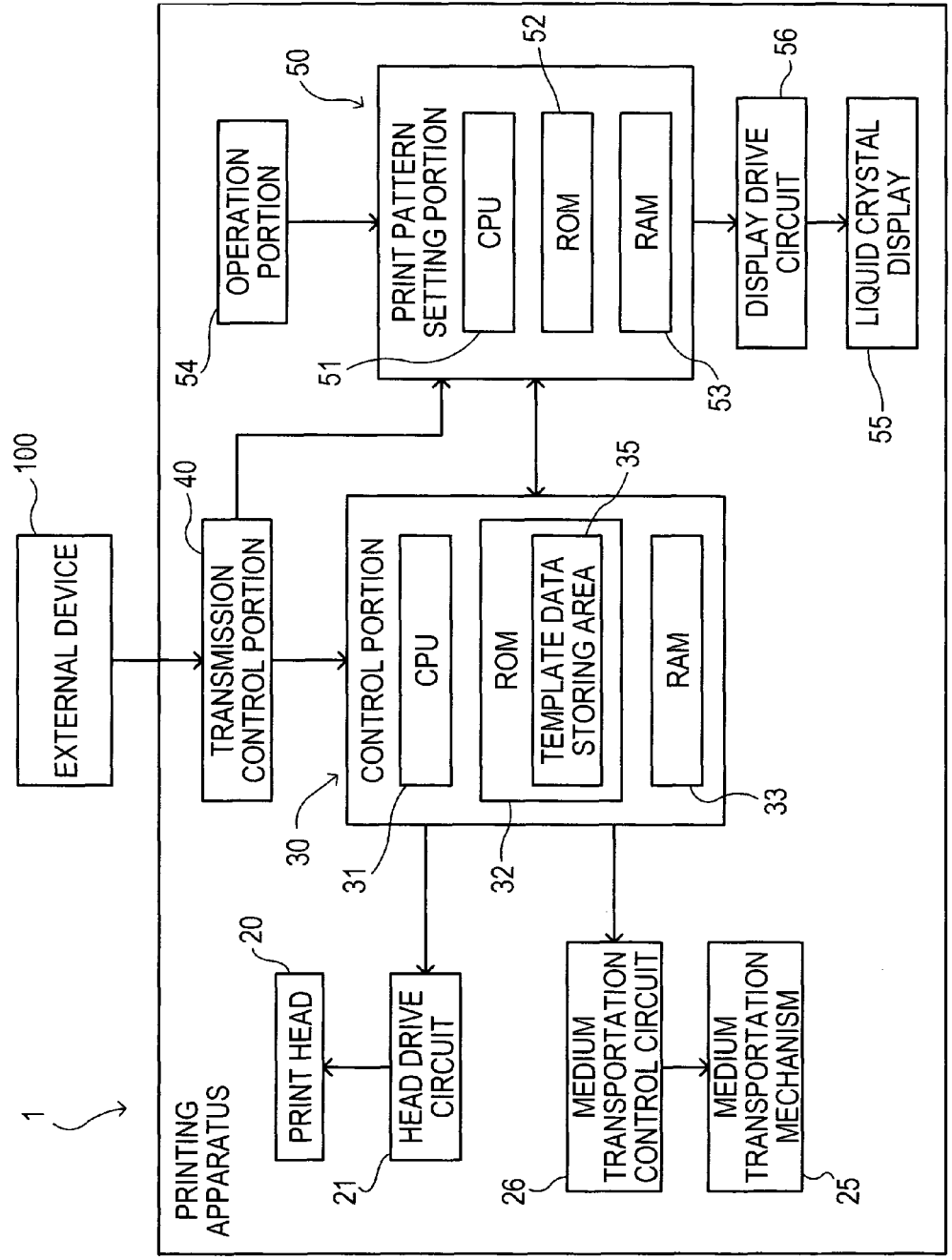
FIG. 1 is a view showing a configuration of a printing apparatus according to a first embodiment.

As shown in FIG. 1, the printing apparatus 1 has a control portion 30. The control portion 30 performs essential operations of printing function. The control portion 30 is configured by a CPU 31, a ROM 32 and a RAM 33.

The CPU 31 performs essential control related to a printing operation of the printing apparatus 1. The CPU 31 is a computing processing apparatus which performs computation based on various control programs stored in the ROM 32.

Figures 2, 3:
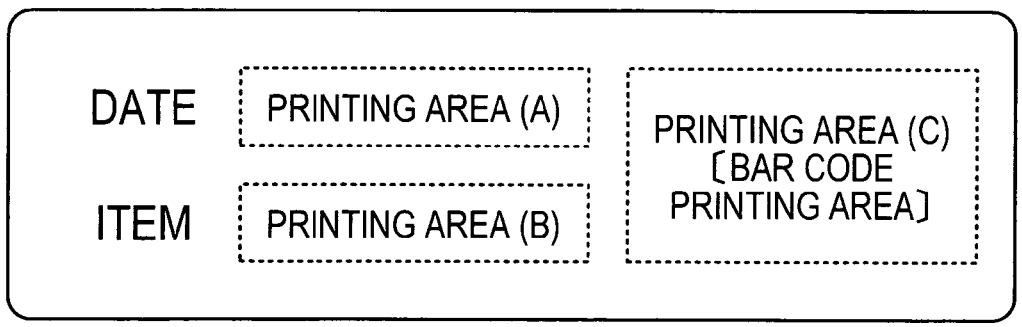
FIG. 2 is a view showing received data sent from an external device.
FIG. 3 is a view related to template data and a printing area.

The ROM 32 is a storing device storing various control programs, data tables and the like which are required for controlling the printing apparatus 1. In other words, the ROM 32 stores a main control program which will be described later (see FIG. 4). The ROM 32 includes a template data storing area 35 (see FIG. 1) which stores various kinds of template data as shown in FIG. 3. The template data stored in the template data storing area 35 will be explained in details later with reference to the drawings.

The RAM 33 is a storing device which temporally stores computation results of various control programs performed by the CPU 31. The RAM 33 functions as a print buffer which temporally stores received data which is to be printed on a printing medium.

In the printing apparatus 1 according to the first embodiment, a print head 20 and a medium transportation mechanism 25 are connected to the control portion 30. Therefore, the control portion 30 sends a control signal to the print head 20 and the medium transportation mechanism 25 to control activation of the print head 20 and the medium transportation mechanism 25. Accordingly, the transportation control of a printing medium is performed.

The print head 20 functions as printing means which prints the received data (including object print data) on a printing medium. The print head 20 is connected to the control portion 30 via a head drive circuit 21. The head drive circuit 21 controls an activation mode of the print head 20 based on a control signal from the control portion 30.

Therefore, the control portion 30 controls the activation mode of the print head 20 via the head drive circuit 21 such that the printing operation is performed on the printing medium in an activation mode which is desired by a user.

The print head 20 may be any kind of print head. In other words, various print heads such as a thermal head and the like can be used for the print head 20.

The medium transportation mechanism 25 is a driving mechanism portion which transports a printing medium. Specifically, the medium transportation mechanism 25 transports a printing medium from a predetermined position (for example, a storing portion where printing mediums are stored) to the print head 20 and transports the print medium which is printed by the print head 20 to a user.

The medium transportation mechanism 25 is connected to the control portion 30 via a medium transportation control circuit 26. The medium transportation control circuit 26 controls activation of the medium transportation mechanism 25 based on the control signal from the control portion 30.

The control portion 30 controls activation of the medium transportation mechanism 25 via the medium transportation control circuit 26. For example, during a printing operation by the print head 20, the control portion 30 controls transportation speed of the printing medium to perform a desired printing operation based on the received data.

Since a configuration of the medium transportation mechanism 25 has been known, detailed explanation thereof is omitted.

The printing apparatus 1 according to the first embodiment has a print pattern setting portion 50. The print pattern setting portion 50 performs control processing for setting an arrangement pattern of each object print data when the received data from the external device 100 (including the object print data which will be described later) is printed based on the template data stored in the template data storing area 35.

The print pattern setting portion 50 includes a CPU 51, a ROM 52 and a RAM 53. The CPU 51 is a computation processing device which essentially controls setting of the arrangement pattern. Therefore, the CPU 51 performs an arrangement pattern setting process program (see FIG. 5) or a setting capability checking process program (see FIG. 6) which will be described later so as to set the arrangement pattern of the object print data with respect to the template data.

The ROM 52 is a storing device which stores various control programs or data tables and the like which are required for performing control of setting an arrangement pattern of each object print data with respect to the template data. In other words, the ROM 52 stores the arrangement pattern setting process program (see FIG. 5) or the setting capability checking process program (see FIG. 6) which will be described later.

Unlike the ROM 32, the ROM 52 does not have the template storing area in FIG. 1. It is possible that the ROM 52 is configured to have the template data storing area.

The RAM 53 is a storing device which temporally stores computation results of various control programs executed by the CPU 51. Since the print pattern setting portion 50 is connected to the control portion 30 via a bus line as shown in FIG. 1, data can be transmitted between the control portion 30 and the print pattern setting portion 50. Therefore, the CPU 51 obtains template data from the template data storing area 35 of the control portion 30 and temporally stores the obtained template data in the RAM 53.

An operation portion 54 and a liquid crystal display 55 are connected to the print pattern setting portion 50.

The operation portion 54 is provided in the printing apparatus 1 and operated various operations by a user. Therefore, when receiving an operation signal based on the operation by the operation portion 54, the print pattern setting portion 50 executes control based on the operation.

Figure 8:
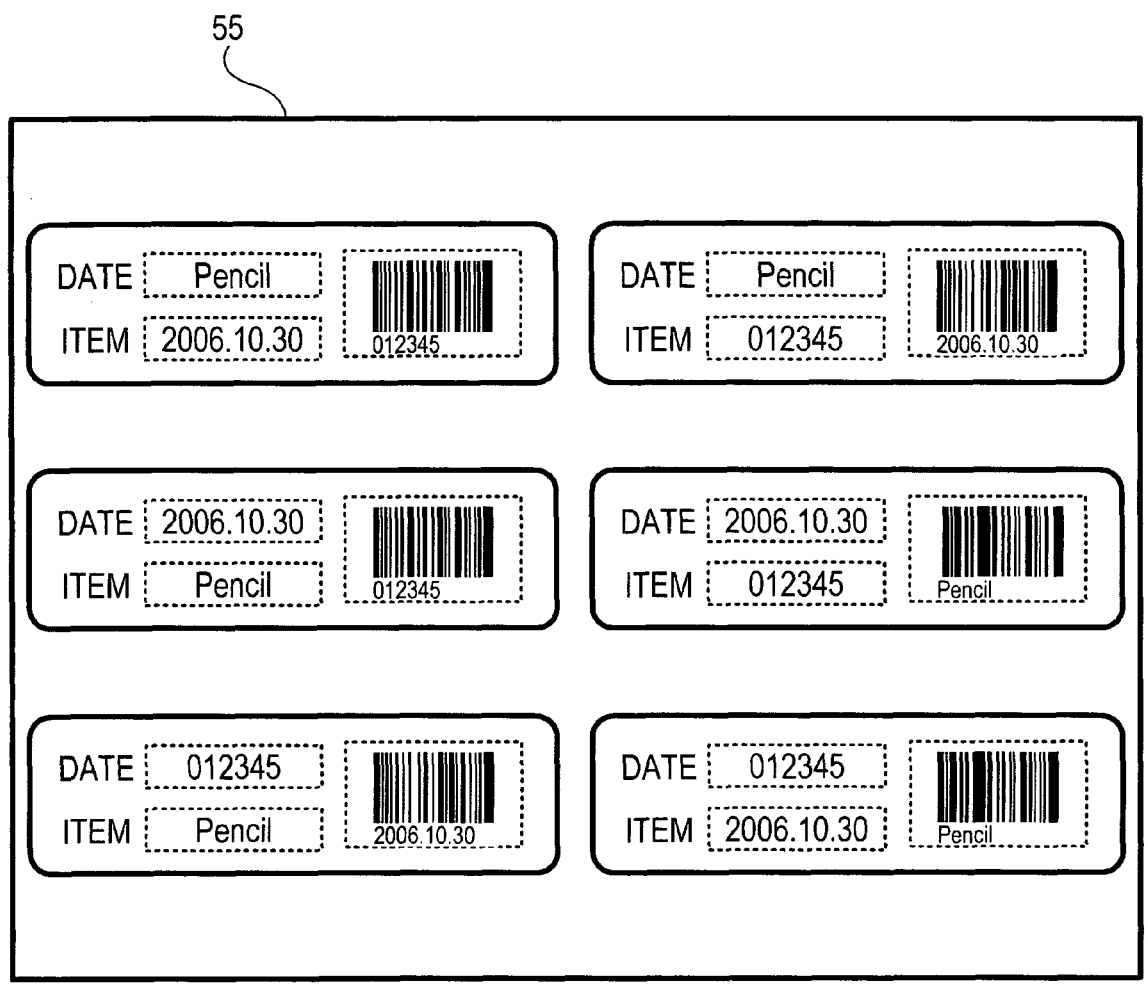
FIG. 8 is a display mode of a liquid crystal display.
Figure 9:
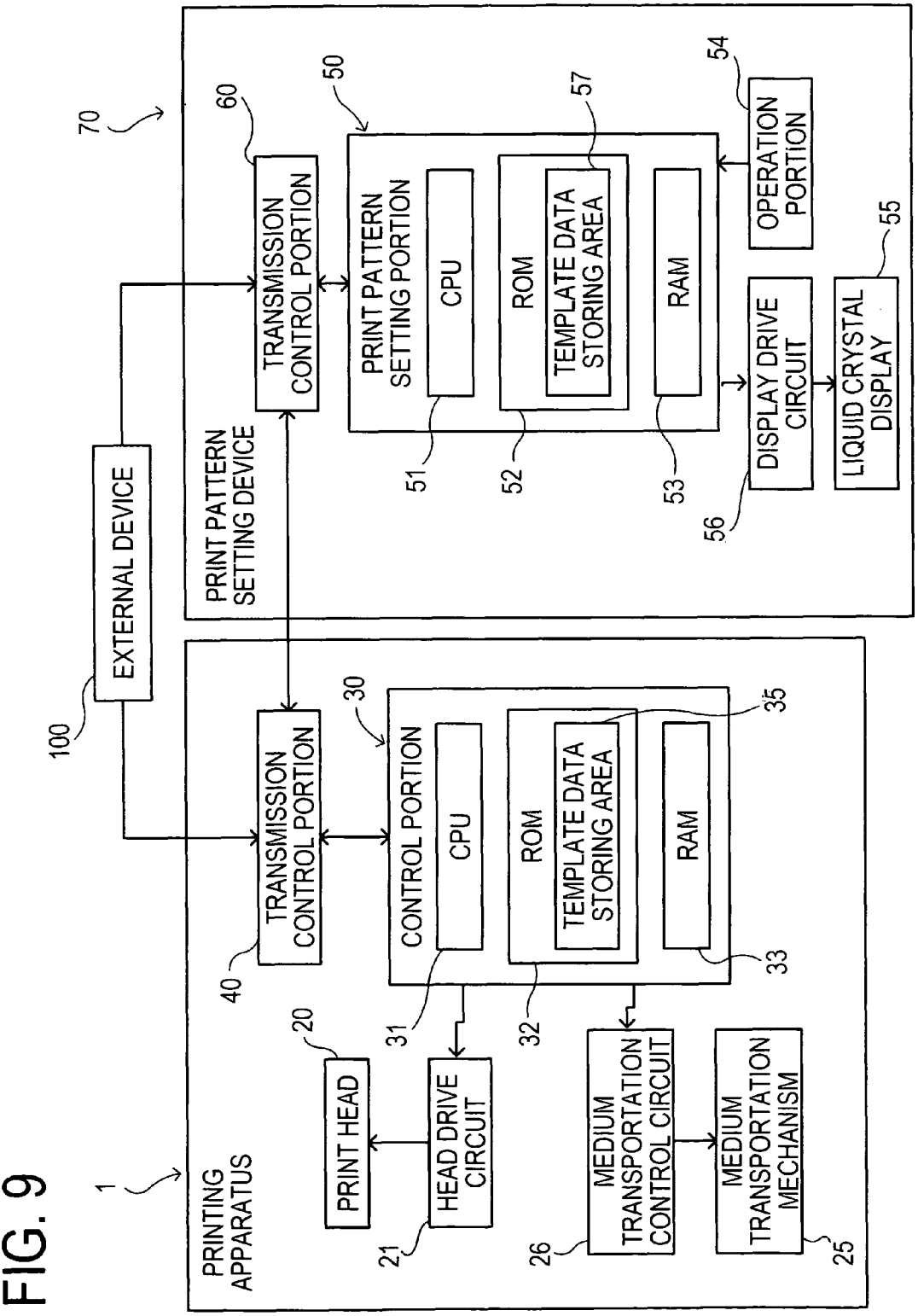
FIG. 9 is a view showing a configuration of a printing apparatus and a print pattern setting device according to a second embodiment.

For example, as described later, when the arrangement pattern is displayed on the liquid crystal display 55 (see FIG. 8) and the operation portion 54 is operated for selecting a desired arrangement pattern, the print pattern setting portion 50 sets the selected arrangement pattern as the arrangement pattern for performing a printing operation related to the template data.

The operation portion 54 may perform other operations (such as a mode changing operation or a print executing operation of the printing apparatus 1 which will be described later).

The liquid crystal display 55 is a display device for displaying preview data which will be described later and is mounted on the printing apparatus 1. The liquid crystal display 55 is connected to the print pattern setting portion 50 via a display drive circuit 56.

The display drive circuit 56 controls a display mode of the liquid crystal display 55 based on a control signal sent from the print pattern setting portion 50. In other words, the display on the liquid crystal display 55 is controlled via the display drive circuit 56 by a control signal from the print pattern setting portion 50.

The control portion 30 and the print pattern setting portion 50 are connected to a transmission control portion 40. The transmission control portion 40 is further connected to the external device 100 which is arranged outside the printing apparatus 1. In other words, the transmission control portion 40 performs data transmission control between the control portion 30, the print pattern setting portion 50 and the external device 100. Therefore, the printing apparatus 1 according to the first embodiment sends the received data sent from the external device 100 (including object print data) to the control portion 30 and the print pattern setting portion 50 via the transmission control portion 40.

Next, the received data sent from the external device 100 will be explained in details with reference to the drawing.

The received data sent from the external device 100 to the printing apparatus 1 according to the first embodiment includes a plurality of object print data. For example, the received data shown in FIG. 2 includes three object print data including object print data (1), object print data (2) and object print data (3).

In case of FIG. 2, the object print data (1) is data comprising a character string of "Pencil" and the object print data (2) is data comprising a character string of "2006. 10. 30". The object print data (3) is data comprising a character string of "012345".

Each of the object print data (1) to (3) has an independent print object which is to be printed (for example, a character string). In other words, the received data sent from the external device 100 is aggregation of a plurality of object print data.

The received data includes object print data and information which specifies each object print data (for example, information representing a top position of each object print data or a defining character and the like) and does not include information which specifies a kind of each object print data. In other words, the received data does not include information which represents a kind of object print data such as a text or a bar code. Further, the received data does not include information which represents a kind of a style, a character decoration and a character size with respect to a text.

The received data is sent to the printing apparatus 1 by a unit of object print data. For example, in the case of the received data shown in FIG. 2, the object print data (1), the object print data (2) and the object print data (3) are sent to the printing apparatus 1 from the external device 100 in this order.

Next, template data used in the printing apparatus 1 according to the first embodiment will be explained in details with reference to a drawing.

As shown in FIG. 3, an area where the object print data should be printed is defined as a printing area in the template data. Three printing areas including the printing area (A), the printing area (B) and the printing area (C) are defined in the template data shown in FIG. 3. The template data includes a printing area width based on a width direction size of the printing area and a printing area height based on a height direction size of the printing area as attribute information for each printing area.

The template data in the first embodiment includes two printing areas including a text printing area and a bar code printing area. The object print data is printed in the text printing area as a text and a bar code which is obtained by converting the object print data is printed in the bar code printing area. Therefore, the template data further has attribute information for each printing area which defines relation with the object print data which is printed in the printing area. The attribute information includes attribute information relating to a kind of the object print data such as a text or a bar code. In case of a text, a style or other information is included in the attribute information, and in case of a bar code, a bar code standard or other information is included in the attribute information.

In this embodiment, the text printing area is referred to as a printing area and the printing area where a bar code is printed is referred to as a bar code printing area.

For example, in the template data shown in FIG. 3, since the printing area (A) and the printing area (B) are text printing areas, the object print data is converted to a text image according to the style or other information included in the attribute information of the printing area and printed in the printing areas (A) and (B). On the other hand, since the printing area (C) is a bar code printing area, an image of a bar code which is obtained by converting the object print data according to the bar code standard included in the attribute information of the printing area is printed in the printing area (C).

Data such as a character or a ruled line which are always printed on the printing medium is defined in the template data other than each printing area. For example, the characters such as "date" or "product item" are defined in the template data shown in FIG. 3.

Next, a main control program of the printing apparatus 1 according to the first embodiment will be explained in details with reference to a drawing.

Figure 4:
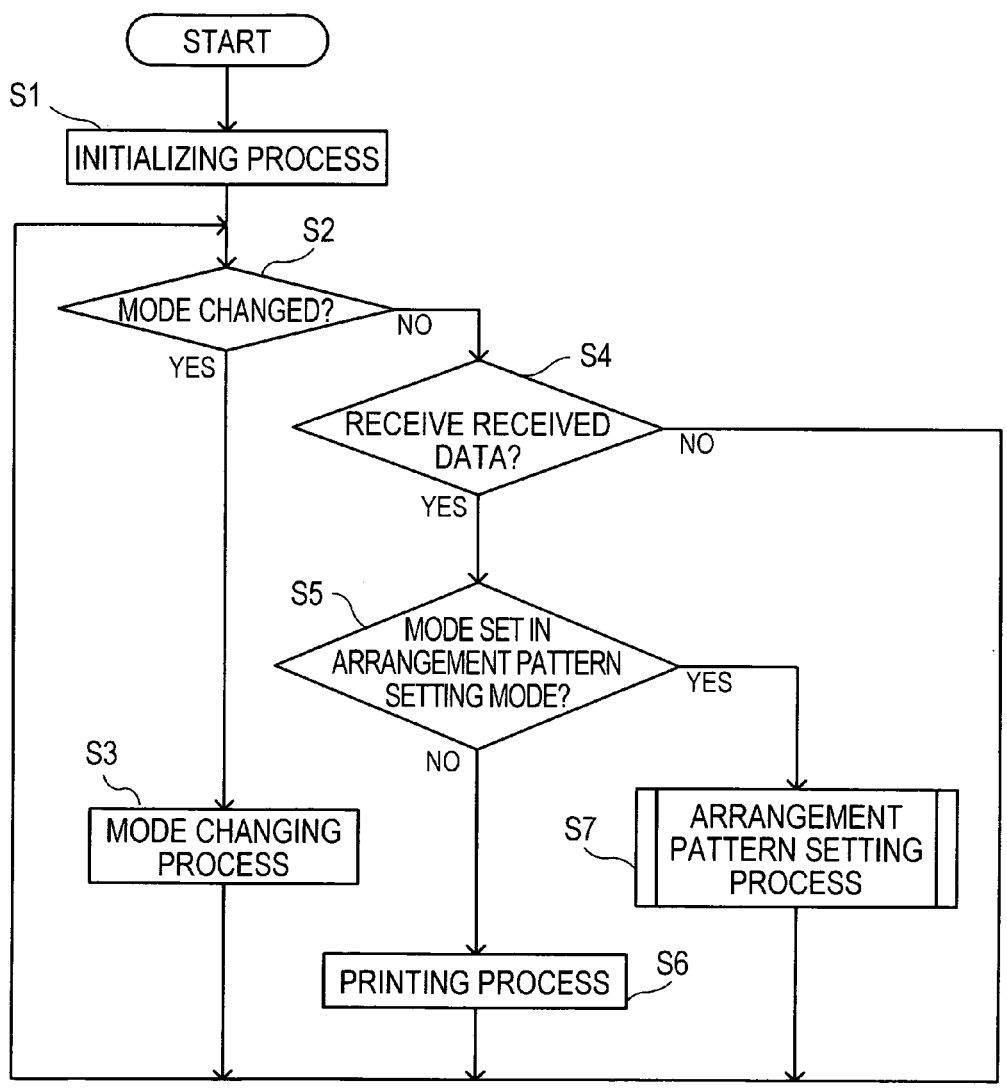
FIG. 4 is a flowchart of a main control program of the printing apparatus.

As shown in FIG. 4, when the main control program is started to be executed in the printing apparatus 1, the CPU 31 executes an initializing process (S1). In the initializing process (S1), stored contents in each storing device (such as the RAM 33 or the RAM 53) and the surrounding devices (such as the medium transportation mechanism 25 or the liquid crystal display 55) are initialized.

The CPU 31 applies a command to the CPU 51 such that the CPU 51 executes the initialization of the RAM 53 or the liquid crystal display 55.

After the initializing process (S1), the CPU 31 proceeds to step S2.

In step S2, the CPU 31 determines whether the mode changing operation is performed by the operation portion 54. Specifically, the CPU 31 receives an operation signal transmitted from the operation portion 54 via the print pattern setting portion 50 and executes the determination process based on the received operation signal. When the mode changing operation is performed (S2: YES), the CPU 31 proceeds to a mode changing process (S3). On the other hand, when the mode changing operation is not performed (S2: NO), the CPU 31 proceeds to step S4.

When the mode changing operation is performed (S2: YES), the CPU 31 changes the mode from the currently set mode to the other mode between the printing mode and the arrangement pattern setting mode. Specifically, the CPU 31 stores a flag corresponding to the changed mode in the RAM 33 so as to perform the mode changing process (S3). The changed mode is one of the printing mode and the arrangement pattern setting mode. After the mode changing process (S3), the CPU 31 returns to step S2.

In the printing mode, the received data from the external device 100 is printed on the printing medium. Therefore, when the template data is set and the arrangement pattern is set to the template data in the printing mode, the printing operation is performed on a printing medium such that the object print image (for example, a text image or a bar code image) is located in the printing area which is defined by the template data based on the set arrangement pattern. The object print image is obtained by converting the object print data.

On the other hand, in the arrangement pattern setting mode, the arrangement pattern of the object print image of the object print data is set with respect to the printing area defined in the template data. The arrangement pattern setting mode will be explained in details later.

In step S4, it is determined whether the CPU 31 receives the received data. Specifically, the CPU 31 executes the determination process of step S4 based on whether the transmission control portion 40 receives the received data. When the transmission control portion 40 receives the received data (S4: YES), the CPU 31 proceeds to step S5. On the other hand, when the transmission control portion 40 does not receive the received data (S4: NO), the CPU 31 returns to step S2.

In step S5, the CPU 31 determines whether the currently set mode is the arrangement pattern setting mode. Specifically, the CPU 31 refers the RAM 33 to check whether the flag stored in the RAM 33 is a flag representing the printing mode or a flag representing the arrangement pattern setting mode. Accordingly, the CPU 31 performs the determination process of step S5. When the flag representing the arrangement pattern setting mode is stored in the RAM 33 (S5: YES), the CPU 31 proceeds to step S7. On the other hand, when the flag representing the printing mode is stored in the RAM 33 (S5: NO), the CPU 31 proceeds to step S6.

In step S6, the CPU 31 performs the printing process. In the printing process (S6), the CPU 31 performs drive control of the print head 20 via the head drive circuit 21 and drive control of the medium transportation mechanism 25 via the medium transportation control circuit 26 so as to perform a printing operation on a printing medium based on the received data.

At this time, when the template data is set and the arrangement pattern with respect to the template data is set, the CPU 31 converts the object print data included in the received data into an object print image which is defined by the attribute information of the printing area and locates the object print image in the printing area based on the arrangement pattern. When converting the object print data into the object print image, the CPU 31 performs same processes as a bar code conversion process (S25) and a text image conversion process (S26) which will be described later. The CPU 31 performs a printing operation on a printing medium based on the arrangement pattern.

After the printing process (S6), the CPU 31 returns to step S2.

When proceeding to step S7, the CPU 31 performs the arrangement pattern setting process. In the printing apparatus 1, the print pattern setting portion 50 performs setting of the arrangement pattern. Therefore, the CPU 31 sends a setting start signal to the print pattern setting portion 50. The CPU 31 waits until receiving a setting signal or an error signal from the print pattern setting portion 50.

When receiving a setting signal from the print pattern setting portion 50, the CPU 31 stores the arrangement pattern included in the setting signal in the template data storing area 35 in relation to the template data and terminates the arrangement pattern setting process (S7). On the other hand, when receiving an error signal from the print pattern setting portion 50, the CPU 31 terminates the arrangement setting process (S7).

After terminating the arrangement pattern process (S7), the CPU 31 returns to step S2.

The arrangement pattern setting process program according to the first embodiment will be explained in details with reference to the drawing.

In the printing apparatus 1 according to the first embodiment, as described above, setting of the arrangement pattern is performed by the print pattern setting portion 50. In other words, the arrangement pattern setting process program is executed by the CPU 51 of the print pattern setting portion 50.

When receiving a setting start signal from the CPU 31 in the arrangement pattern setting process (S7), the CPU 51 of the print pattern setting portion 50 starts execution of the arrangement pattern setting process program.

Figure 5:
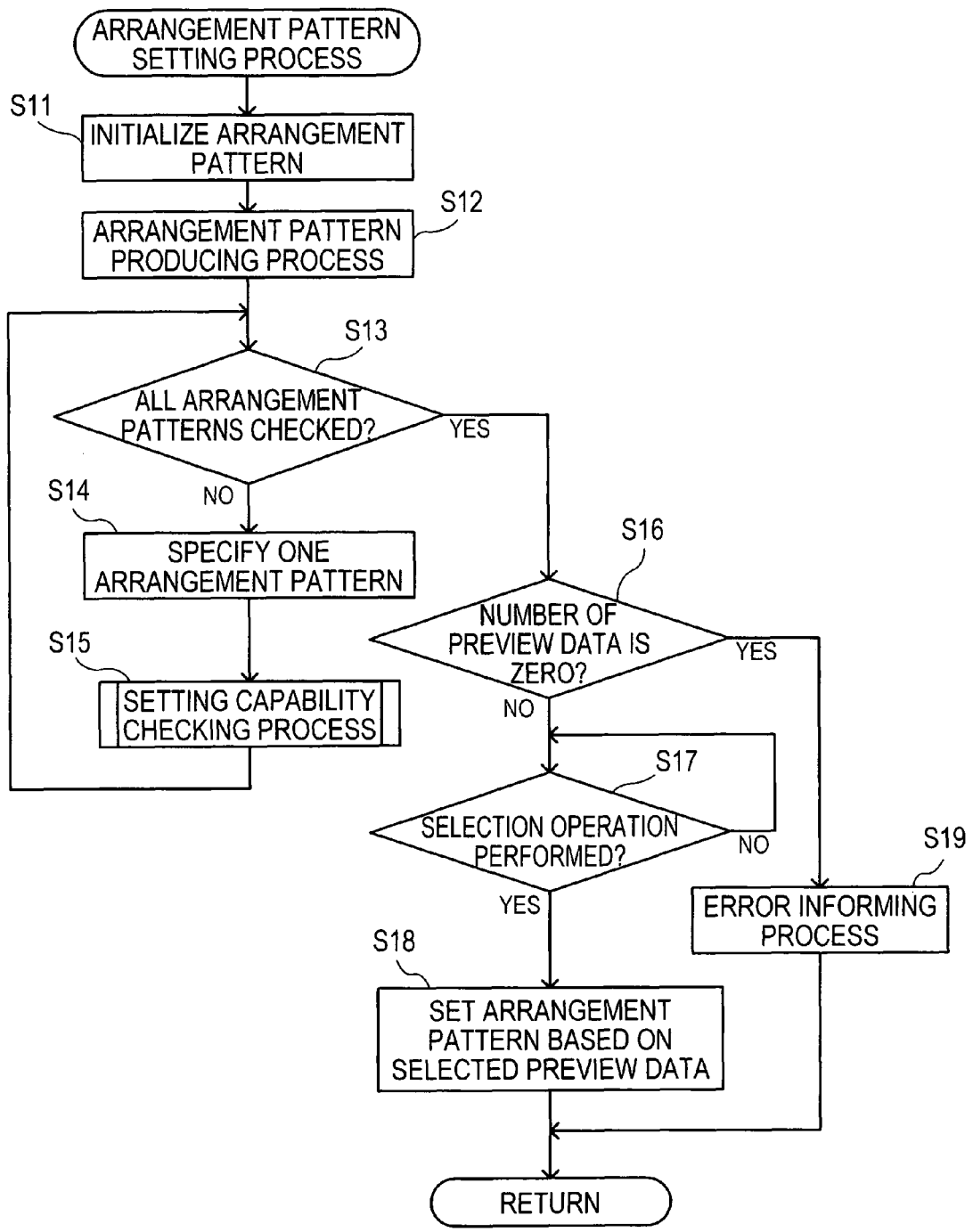
FIG. 5 is a flowchart of an arrangement pattern setting process program.

As shown in FIG. 5, the CPU 51 initializes the arrangement pattern of the template data which is currently set in the printing apparatus 1 (S11). After initializing the arrangement pattern, the CPU 51 proceeds to step S12.

Proceeding to step S12, the CPU 51 executes the arrangement pattern producing process. In the arrangement pattern producing process (S12), the CPU 51 produces arrangement patterns of all combinations which can be produced based on the number of object print data included in the received data and the number of printing areas defined in the template data. After producing arrangement patterns of all combinations which can be produced based on the object print data and the printing areas, the CPU 51 proceeds to step S13.

The arrangement pattern producing process will be specifically explained. In this example, the received data shown in FIG. 2 is sent from the external device 100 and at this time the template data shown in FIG. 3 is set.

As described above, the received data shown in FIG. 2 includes three object print data including the object print data (1), the object print data (2) and the object print data (3). The printing area (A), the printing area (B) and the printing area (C) are defined in the template data shown in FIG. 3.

Therefore, the number of arrangement patterns which can be produced from the three object print data and the three printing areas are six. In this case, the CPU 51 produces six arrangement patterns of the arrangement patterns (1) to (6) shown in FIG. 7. After storing the arrangement patterns (1) to (6) in the RAM 53, the CPU 51 proceeds to step S13.

When proceeding to step S13, the CPU 51 determines whether all the arrangement patterns produced in the arrangement pattern producing process (S12) are checked whether to be printed on a printing medium. In other words, the CPU 51 determines whether all the arrangement patterns are processed by the setting capability checking process (S15). When all the arrangement patterns have been checked (S13: YES), the CPU 51 proceeds to step S16. On the other hand, when all the arrangement patterns have not been checked (S13: NO), the CPU 51 proceeds to step S14.

If there is an arrangement pattern whose preview data has not yet been produced (S13: NO), the CPU 51 specifies one arrangement pattern whose preview data has not yet been produced in step S14. After specifying one arrangement pattern, the CPU 51 proceeds to the setting capability checking process (S15).

When proceeding to the setting capability checking process (S15), the CPU 51 determines whether the received data can be printed on a printing medium based on the arrangement pattern which has been specified in step S14. Specifically, the CPU 51 produces an object print image corresponding to the object print data located in each printing area based on the arrangement pattern specified in step S14 and determines whether the object print data can be printed on a printing medium according to the object print image. At this time, the CPU 51 determines whether the object print image based on the object print data can be printed within the printing area or whether the object print data has any problem with respect to the bar code standard (for example, code 128).

If the corresponding object print data can be printed in all the printing areas, the CPU 51 produces preview data based on the arrangement pattern and displays the preview data on the liquid crystal display 55. If there is a printing area where the corresponding object print data cannot be printed, the CPU 51 does not produce preview data corresponding to the arrangement pattern. Therefore, in this case, the liquid crystal display 55 does not display preview data corresponding to the arrangement pattern.

When terminating the setting capability checking process with respect to the arrangement pattern which has been specified in step S14, the CPU 51 returns to step S13. Thereby, the CPU 51 checks the arrangement patterns which are not checked with the setting capability checking process.

Details of the setting capability checking process (S15) will be explained later with reference to the drawing. Therefore, detailed explanation thereof is omitted here.

After checking all the arrangement patterns produced in the arrangement pattern producing process (S12) with the setting capability checking process (S15) (S13: YES), the CPU 51 determines whether the number of preview data displayed on the liquid crystal display 55 is zero (S16).

If the number of preview data is zero (S16: YES), the CPU 51 proceeds to an error informing process (S19). When the number of preview data is zero (S16: YES), preview data is not displayed on the liquid crystal display 55. In other words, in this state, there is no arrangement pattern with which all the object print data included in the received data can be printed in each printing area without any errors.

On the other hand, the number of preview data is not zero (S16: NO), the CPU 51 proceeds to step S17. At this time, at least one preview data is displayed on the liquid display 55. In this state, there is at least one arrangement pattern with which all the object print data can be printed in each printing area without any error.

The CPU 51 determines whether a selecting operation is performed by the operation portion 54 in step S17. In the selecting operation, one preview data is selected from the preview data (see FIG. 8) displayed on the liquid crystal display 55. As described above, preview data is produced based on each one of the arrangement patterns. Therefore, selecting preview data means selecting an arrangement pattern.

The CPU 51 determines whether the selecting operation is performed based on an operation signal from the operation portion 54. When the selecting operation is performed (S17: YES), the CPU 51 proceeds to step S18. On the other hand, when the selecting operation is not performed (S17: NO), the CPU 51 waits until the selecting operation is performed.

When the selecting operation is performed by the operation portion 54, the CPU 51 sets the arrangement pattern corresponding to the selected preview data as the arrangement pattern with respect to the template data.

Specifically, the CPU 51 defines the arrangement pattern with which the selected preview data is produced and sends a setting signal representing the arrangement pattern to the control portion 30.

When receiving the setting signal, the control portion 30 stores the arrangement pattern included in the setting signal in the template data storing area 35 in relation to the template data. Therefore, the CPU 51 sends the setting signal so as to set the arrangement pattern with respect to the template data.

After sending the setting signal, the CPU 51 terminates the arrangement pattern setting process program.

If the number of preview data is zero (S16: YES), the CPU 51 executes the error informing process (S19).

As described above, the preview data is produced when all the object print data can be normally printed in each printing area. In other words, when the number of preview data is zero, the preview data includes at least one error that the printing operation cannot be performed. If the arrangement pattern is set with respect to the template data in this state, an error occurs when the printing operation is performed on a printing medium. Therefore, the printing apparatus 1 disables the setting of the preview data (arrangement pattern) and informs a user of an error.

Specifically, when proceeding to the error informing process (S19), the CPU 51 controls a display mode of the liquid display 55 via the display drive circuit 56 so as to inform that there is no arrangement pattern which can be set. Accordingly, a user recognizes that an error occurs and changes any settings such as template data. This eliminates the error.

The CPU 51 sends an error signal to the CPU 31 while displaying an error on the liquid crystal display 55. The CPU 31 of the control portion 30 receives the error signal and terminates the arrangement pattern setting process (S7).

After terminating the error informing process (S19), the CPU 51 terminates the arrangement pattern setting process program.

Next, the setting capability checking process program which is executed in step S15 of the arrangement pattern setting process program will be explained in details with reference to the drawing.

When proceeding to the setting capability checking process (S15), the CPU 51 starts to execute the setting capability checking process program.

At this time, the RAM 53 stores the received data (including the object print data) received via the transmission control portion 40 and the currently set template data which is obtained from the template data storing area 35.

In this state, in step S14, one arrangement pattern is specified out of the arrangement patterns which are produced in the arrangement pattern producing process (S12).

In step S21, the CPU 51 reads each object print data included in the received data and template data which are stored in the RAM 53.

The CPU 51 determines whether all the printing areas of the template data have been checked if the object print data corresponding to the specified arrangement pattern can be printed in each printing area (S22). When determining that all the printing areas have been checked (S22: YES), the CPU 51 proceeds to the display process (S29). On the other hand, when determining that all the printing areas have not been checked (S22: NO), the CPU 51 proceeds to step S23.

In step S23, the CPU 51 specifies one printing area which is defined in the template data and determines whether the specified printing area (object printing area) is a bar code printing area. As described above, since the bar code printing area may be defined in the template data (see FIG. 3), the CPU 51 refers to the template data to make a determination of step S23. If the specified printing area is a bar code printing area (S23: YES), the CPU 51 proceeds to step S24. On the other hand, the specified printing area is not a bar code printing area (S23: NO), the CPU 51 proceeds to the text image conversion process (S26).

If the specified printing area is a bar code printing area (S23: YES), the CPU 51 specifies object print data which corresponds to the specified printing area based on the arrangement pattern and determines whether the object print data satisfies conditions of the bar code standard (for example, bar code 128)(S24). Specifically, the CPU 51 determines whether the object print data includes the number of characters and a kind of characters which are allowed by the bar code standard. If the object print data satisfies the conditions of the bar code standard (S24: YES), the CPU 51 proceeds to step S25. If the object print data does not satisfy the conditions of the bar code standard (S24: NO), the CPU 51 terminates the setting capability checking process program.

Therefore, if the object print data which corresponds to the bar code printing area does not satisfy the conditions of the bar code standard, the arrangement pattern including this bar code printing area is determined to have an error and is not displayed on the liquid display 55. The printed result of the object print data with the arrangement pattern including the bar code printing area which does not satisfy the conditions of the bar code standard cannot be used as a bar code. Therefore, this arrangement pattern cannot be set as an arrangement pattern with respect to the template data. Since the arrangement pattern which causes a problem that the printed result cannot be used as a bar code cannot be set as an arrangement pattern, the printing apparatus 1 prevents disadvantages to a user who uses the printed printing medium.

In the determination process of step S24, it may be determined whether the print data satisfies conditions of the bar code standard based on a check digit or based on the number of characters and the check digit.

In checking with a check digit, if the object print data includes a check digit, a computation result of the check digit which is obtained by a computation method based on the bar code standard coincides with the check digit included in the object print data. If the computation result does not coincide with the check digit, it is determined that an error occurs in the object print data.

When the object print data corresponding to the bar code printing area satisfies the conditions of the bar code standard (24: YES), the CPU 51 executes the bar code conversion process (S25). In the bar code conversion process (S25), the CPU 51 produces a bar code image from the object print data according to the attribute information related to the object printing area (that is, the bar code standard) as a bar code data.

Since the technique related to the conversion to a bar code has been known, the detailed explanation thereof will be omitted.

After converting the object print data and producing the bar code image, the CPU 51 stores the bar code data in the RAM 53 and proceeds to step S27.

On the other hand, in step S26 proceeded when the object printing area is not a bar code printing area (S23: NO), the CPU 51 executes the text image conversion process. In the text image conversion process (S26), the CPU 51 converts the object print data into a text image according to the attribute information related to the object printing area (that is, style, character size, character decoration and so on).

Since the technique related to the conversion to a text image has been known, the detailed explanation will be omitted.

After converting the object print data into a text image, the CPU 51 stores the text image in the RAM 53 and proceeds to step S27.

In step S27, the CPU 51 determines whether the object print image (for example, a text image or a bar code image) of the object print data can be located in the corresponding object printing area. As described above, each printing area of the template data is defined by a printing area width and a printing area height. Therefore, the CPU 51 makes a determination of step S27 by comparing the width and the height of the object print image of the object print data with the printing area width and the printing area height.

If the object print image of the object print data can be located in the corresponding object printing area (S27: YES), the CPU 51 proceeds to step S28. If the object print image of the object print data cannot be located in the corresponding object printing area, that is, a part of the object print image of the object print data is located outside of the corresponding object printing area (S27: NO), the CPU 51 terminates the setting capability checking process program.

The arrangement pattern with which the object print image of the object print data cannot be located in the corresponding object printing area is not displayed on the liquid crystal display 55 as preview data and is not set as the arrangement pattern corresponding to the template data. Therefore, the printing apparatus 1 cannot set the arrangement pattern which may cause a deteriorated printing result where the object print image of the object print data is printed outside the printing area. This prevents disadvantages to a user who uses the printed printing medium.

In step S28, the CPU 51 changes the current object printing area to a next one and obtains object print data corresponding to the next printing area from the RAM 53. At this time, data representing that the printing capability checking process has been performed is applied to the printing area and the object print data which have been processed by the processes of steps S23 to S27.

After changing the object printing area and obtaining the object print data corresponding to the changed printing area, the CPU 51 proceeds to step S22.

When all the printing areas related to the template data are checked whether the object print data can be printed in the corresponding object printing area based on the arrangement pattern specified in step S14 and determining that the object print data can be printed in all the object printing areas (S22: YES), the CPU 51 proceeds to the display process (S29).

In the display process (S29), the CPU 51 produces preview data based on the arrangement pattern specified in step S14, the object print data included in the received data and the template data and displays the preview data on the liquid crystal display 55. After displaying the produced preview data on the liquid crystal display 55, the CPU 51 terminates the setting capability checking process program.

Production of preview data will be specifically explained based on the received data shown in FIG. 2 and the template data shown in FIG. 3.

For example, when preview data is produced based on the arrangement pattern (1) shown in FIG. 7, since the object print data (1) is related to the printing area (A), the character string of "Pencil" corresponding to the object print data (1) is located in the printing area (A). Similarly, the character string of "2006. 10. 30" corresponding to the object print data (2) is located in the printing area (B).

The object print data (3) is related to the printing area (C) and the printing area (C) is a bar code printing area. Therefore, the character string of "012345" corresponding to the object print data (3) is converted into a bar code based on a predetermined standard (for example, code 128) via the bar code conversion process (S25). The converted bar code is located in the printing area (C). The character string of "012345" is printed under the bars and called "lower characters". In this case, the bar code includes the bars and the lower characters. A bar code may not include lower characters according to the attribute information included in the printing area of the template data.

Accordingly, the preview data produced based on the arrangement pattern specified in step S14 (in this case, the arrangement pattern (1)) is displayed on the liquid crystal display 55. After displaying the preview data on the liquid crystal display 55, the CPU 51 terminates the setting capability checking process program.

With respect to the arrangement pattern with which the preview data is produced, it is determined in the processes of steps S22 to S28 that the object print images of the corresponding object print data can be printed in all the printing areas. Therefore, if a user selects an arrangement pattern corresponding to the preview data displayed on the liquid crystal display 55, the user can always obtain a printed matter with a good appearance without having an error in a bar code and without causing a problem that the object print image is printed outside of the printing area.

Thus, the setting capability checking process (S15) is executed for all the arrangement patterns produced in the arrangement pattern producing process (S12). Accordingly, only the preview data produced based on the arrangement pattern with which the object print data can be printed on the printing medium is displayed on the liquid crystal display 55 (see FIG. 8). In other words, only the preview data produced based on the arrangement pattern which can be set with respect to the template data is displayed on the liquid crystal display 55.

Since the liquid crystal display 55 displays the preview data, a user can confirm a desired arrangement pattern only by seeing the liquid crystal display 55.

The user can set the arrangement pattern with which the object print data can be printed only by selecting the preview data displayed on the liquid crystal display 55. Therefore, the user can easily perform setting related to a printing operation of the received data based on the template data.

As explained above, in the printing apparatus 1 according to the first embodiment, when the object print image of the object print data included in the received data is located in each printing area defined by the corresponding template data so as to be printed on a printing medium, the preview data produced by locating the object print data in each printing area is displayed on the liquid crystal display 55. Therefore, the user can see a plurality of arrangement patterns and surely confirm a desired arrangement pattern.

In the printing apparatus 1, by selecting the preview data displayed on the liquid crystal display 55 with the operation portion 54, the arrangement pattern corresponding to the preview data can be set for the template data. Therefore, when the arrangement pattern is set for the template data, complicated operations are not required (for example, confirmation of the order in which the object print data is sent or a setting operation for setting the printing area where the object print image of the object print data is located) and the user can set a desired arrangement pattern for the template data with a simple operation.

The user sets a desired arrangement pattern for the template data. Accordingly, when printing the received data based on the template data, the printing apparatus 1 provides a printed matter where the object print data is printed with a desired arrangement pattern.

In the printing apparatus 1, only the preview data based on the arrangement pattern with which the object print data can be printed in all the printing areas is displayed on the liquid crystal display 55. Therefore, when the object print data is printed based on the set arrangement pattern, it is prevented that the deteriorated printed result is obtained or the printed result does not function as a bar code. In other words, the printing apparatus 1 always provides a good printed matter which can be used as the user's desire.

In the printing apparatus 1, based on the operation of the operation portion 54, the mode is switched between the printing mode and the print pattern setting mode. In other words, after the arrangement pattern is set for the template data in the print pattern setting mode, a printed matter is provided based on a desired arrangement pattern in the printing mode. Accordingly, when printing the received data, a user obtains a desired printed matter without setting an arrangement pattern in the print pattern setting mode every time.

While the presently exemplary embodiment has been shown and described, it is to be provisionally determined understood that this disclosure is for the purpose of illustration and that various changes and modifications may be made without departing from the scope of the disclosure as set forth in the appended claims.

For example, in the first embodiment, kinds of object print images include a text image and a bar code image, however, various types of images may be additionally used. For example, a two dimensional image or an arrangement text image where a text is located along a predetermined line may be used.

In the first embodiment, the printing apparatus 1 performs a printing operation on a printing medium and a setting operation of an arrangement pattern for template data. However, a device for performing a printing operation on a printing medium and a device for setting an arrangement pattern for template data may be separately provided.

A second embodiment will be explained in details with reference to the drawing. In the second embodiment, the printing apparatus and a printing pattern setting device are separately provided. In the second embodiment, the same numbers are applied to the configuration same as in the first embodiment.

[Second Embodiment]

In the second embodiment, as described above, the printing apparatus 1 and a print pattern setting device 70 are separately provided.

Like the first embodiment, in the printing apparatus 1 according to the second embodiment, the control portion 30 executes printing control. The control portion 30 includes the CPU 31, the ROM 32 and the RAM 33. The template data storing area 35 is formed in the ROM 32.

Since the configuration of the control portion 30 is same as in the first embodiment, the detailed explanation thereof will be omitted.

In the printing apparatus 1 according to the second embodiment, the print head 20 is connected to the control portion 30 via a head drive circuit 21 and the medium transportation mechanism 25 is connected to the control portion 30 via a medium transportation control circuit 26. The transmission control portion 40 is connected to the control portion 30.

Since the configurations of the surrounding devices are same as in the first embodiment, the detailed explanation thereof will be omitted.

As described above, in the second embodiment, the print pattern setting device 70, which is independently provided of the printing apparatus 1, sets an arrangement pattern for template data. Therefore, the printing apparatus 1 does not include the print pattern setting portion 50 and surrounding devices connected to the print pattern setting portion 50.

The print pattern setting device 70 includes a print pattern setting portion 50 which essentially controls the print pattern setting device 70. The print pattern setting portion 50 includes the CPU 51, the ROM 52 and the RAM 53. Unlike the first embodiment, the ROM 52 includes a template data storing area 57 which stores the same contents as the template data storing area 35 of the printing apparatus 1.

The configurations of the CPU 51 and the RAM 53 are same as in the first embodiment.

The operation portion 54, the liquid crystal display 55 and the transmission control portion 60 are connected to the print pattern setting portion 50. Since the configurations of the operation portion 54, the liquid crystal display 55 and the display drive circuit 56 are same as in the first embodiment, the detailed explanation thereof is omitted.

The transmission control portion 60 transmits data between the print pattern setting device 70, the printing apparatus 1 and the external device 100. In other words, a basic function of the transmission control portion 60 is same as that of the transmission control portion 40 of the printing apparatus 1.

In the printing apparatus 1 configured as described above, the CPU 31 executes the main control program like the first embodiment. Since the main control program (see FIG. 4) has been explained, the explanation thereof is omitted.

Figure 6:
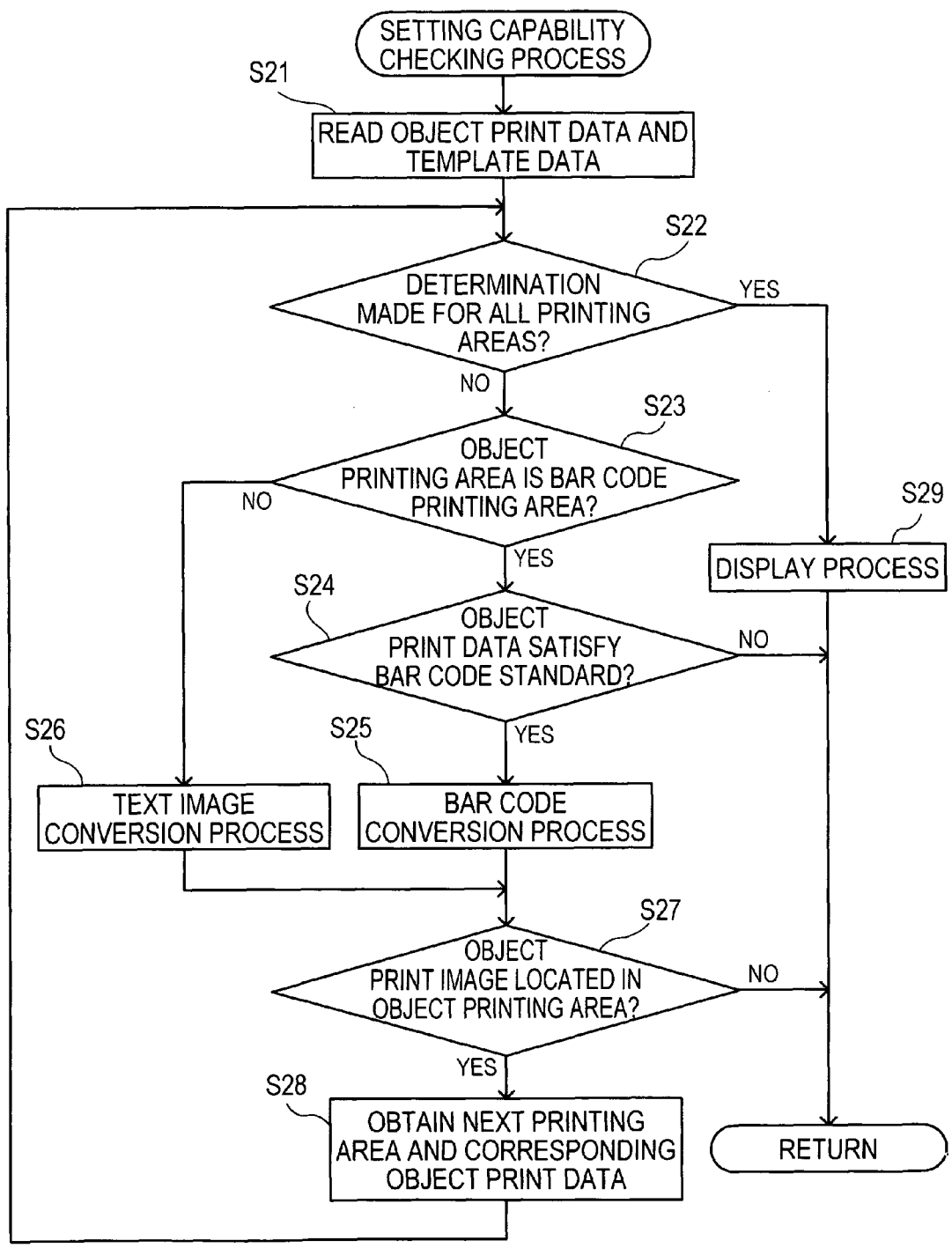
FIG. 6 is a flowchart of a setting capability checking process program.

Like the print pattern setting portion 50 in the first embodiment, in the print pattern setting device 70, the CPU 51 executes the arrangement pattern setting process program (see FIG. 5) and the setting capability checking process program (see FIG. 6). Since the arrangement pattern setting process program and the setting capability checking process program have been explained in the first embodiment, the explanation thereof is omitted.

In the second embodiment, the print pattern setting device 70 produces preview data produced by locating the object print data in the corresponding printing area and displays the preview data on the liquid crystal display 55. Therefore, a user can see a plurality of arrangement patterns and surely identify a desired arrangement pattern.

In the print pattern setting device 70, a user selects preview data displayed on the liquid crystal display 55 via the operation portion 54 so as to set the arrangement pattern corresponding to the selected preview data for the template data. Therefore, when setting the arrangement pattern for the template data, complicated operations (for example, an operation for confirming the transmission order of the object print data or an operation for setting a printing area where the object print image of the object print data is located) are not required. A user can sets a desired arrangement pattern for the template data with a simple operation.

Further, in the print pattern setting device 70, the liquid crystal display 55 displays only the preview data based on the arrangement pattern with which it is determined that object print data can be printed in all the printing areas via the setting capability checking process (S15). Therefore, when printing the object print data based on the set arrangement pattern, it can be prevented that a deteriorated printed result is obtained or an arrangement pattern with which a printed result does not function as a bar code is set.

In the second embodiment, the external device 100 is directly connected to the print pattern setting device 70 and the print pattern setting device 70 directly obtains the received data from the external device 100. However, this is not limited thereto. That is, the external device 100 may not be connected to the print pattern setting device 70 and the print pattern setting device 70 may obtain the received data via the printing apparatus 1.

[Third Embodiment]

Next a third embodiment will be explained.

[Explanation of Characteristics of the Printing Apparatus]

Figure 10:
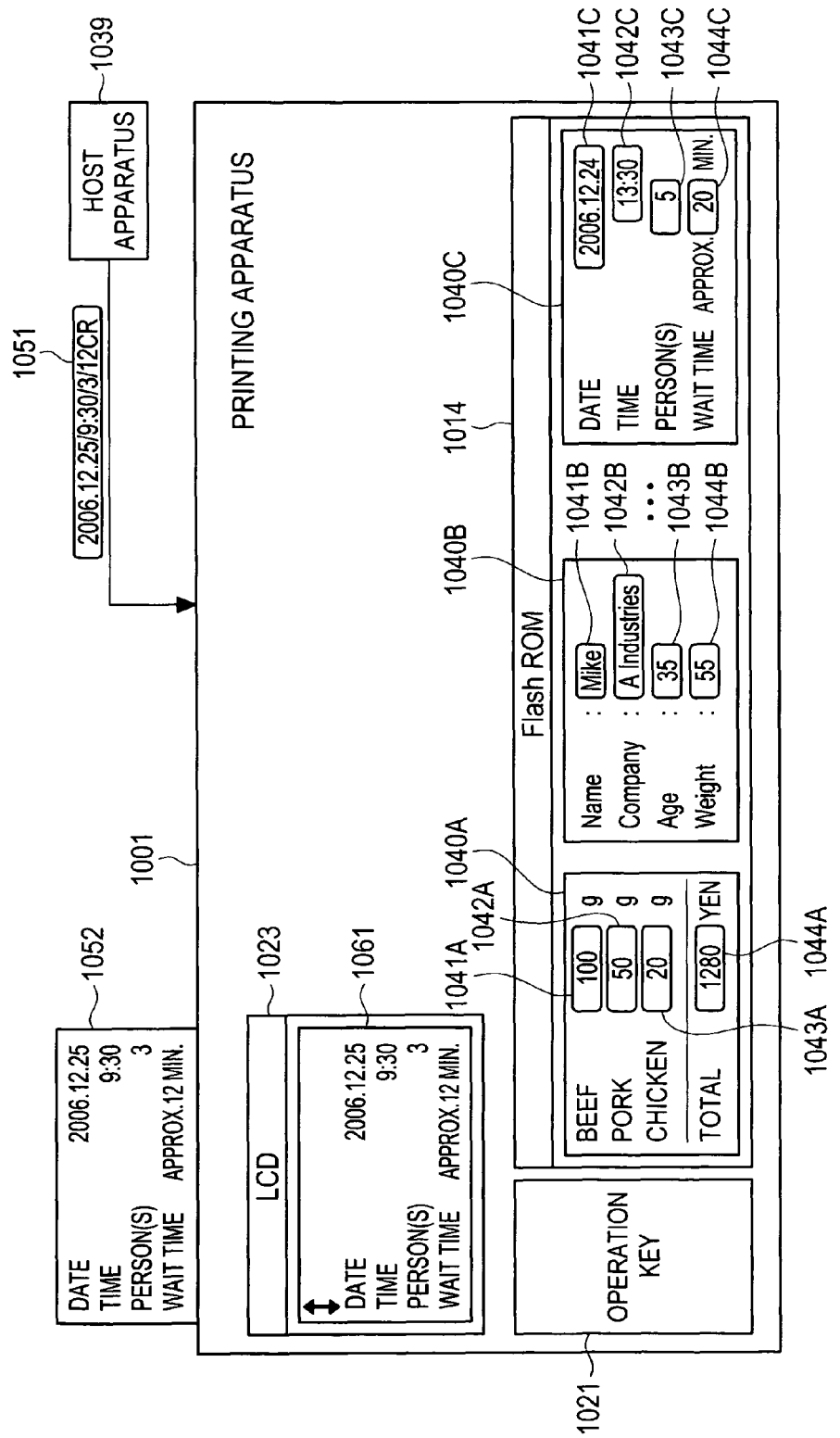
FIG. 10 is a view showing characteristics of a printing apparatus according to a third embodiment.

As shown in FIG. 10, in the printing apparatus 1001 according to the third embodiment, a Flash ROM 1014 stores a template 1040A, a template 1040B, a template 1040C and the like. The template 1040A includes four input items 1041A, 1042A, 1043A and 1044A, the template 1040B includes four input items 1041B, 1042B, 1043B and 1044B, and the template 1040C includes four input items 1041C, 1042C, 1043C and 1044C. Default data is input in each input item 1041, 1042, 1043, 1044 of each template 1040. Although it is not shown, approximately a hundred of templates 1040 are stored in the Flash ROM 1014 with specified numbers. The number of input items of each template 1040 is not limited to four such as the templates 1040A, 1040B and 1040C. Other templates 1040 may have one, two, three, five, six or other number of input items.

In the printing apparatus 1001 according to the third embodiment, thirty or less than thirty templates 1040 are picked up from the Flash ROM 1014 which are appropriate for the received data 1051 from a host apparatus 1039. A print preview 1061 where the received data 1051 is input to the picked up template 1040 is displayed on a LCD 1023.

The received data 1051 from the host apparatus 1039 (for example in FIG. 10, "2006. 12. 25/9:30/3/12CR") includes delimiters (for example in FIG. 10, "/", "/" and "/") for limiting each item data and print start data which corresponds to a print start command (for example in FIG. 10, "CR"), in addition to the item data each of which can be input to each of the templates 1040 (for example in FIG. 10, "2006. 12. 25", "9:30", "3" and "12"). "CR" is an abbreviation of a carriage return code and represents one code. The carriage return code is one of control codes of ASCII code.

However, the printing apparatus 1001 of the third embodiment cannot recognize a delimiter or print start data included in the received data 1051 from the host apparatus 1039. The printing apparatus 1001 according to the third embodiment obtains a character string, which is periodically repeated the number of times, from the received data 1051 from the host apparatus 1039 and determines the character string as a delimiter candidate.

At this time, Delimiter candidates are applied with a priority order based on a first predetermined rule. This priority order corresponds to a first priority order of the disclosure. According to the first predetermined rule, the kind of characters which form a character string is limited to a control code or a symbol and a delimiter candidate where the number of times a character string is repeated periodically is large and the length of the character string is shorter has priority. In the example in FIG. 10, the delimiter candidates include "/", ".", ":", "CR" having priority in this order.

Further, in the printing apparatus 1001 according to the third embodiment, print start data candidates are obtained from data group which is located from a last character to a delimiter candidate having a highest priority order in the received data 1051 from the host apparatus 1039. According to a third predetermined rule, the print start data candidate is limited to a control code or a character string of symbols, and a control code has priority to a symbol and a shorter character string has priority. This priority order corresponds to a third priority order in the disclosure. In the example shown in FIG. 10, only "CR" is a print start data candidate.

In the printing apparatus 1001, as described above, thirty or less than thirty templates 1040 appropriate for the received data 1051 from the host apparatus 1039 are picked up as template candidates. According to this pick up method, the number of input items of the templates 1040 which are to be picked up is greater than the number of delimiters included in the received data 1051 from the host apparatus 1039 by one. Accordingly, the number of item data included in the received data 1051 from the host apparatus 1039 is computed based on the delimiter candidate which has a highest priority order. Then, a plurality of templates 1040 having the number of input items which is same as the number of item data are selected. Next, some of the selected plurality of templates 1040 are further selected based on the condition that the kind of characters input to each input item as default data is same as the kind of characters (number, alphabet, symbol) in each item data which is presumed by dividing the received data 1051 from the host apparatus 1039 by the delimiter candidate. Further, some of the selected templates 1040 are selected based on the condition that the number of characters input to each input item as default data is same as the number of characters in each item data which is presumed by dividing the received data 1051 from the host apparatus 1039 by the delimiter candidate.

At this time, the template candidates are applied with a priority order based on a second predetermined rule. This priority order is a second priority order in the disclosure. According to the second predetermined rule, the template candidates are ordered from those having highest priority based on the condition that the number of characters and the kind of characters and the number of input items included in the picked up template candidates are same as those of the received data 1051 from the host apparatus 1039 and those having next highest priority based on the condition that the kind of characters and the number of input items included in the picked up template candidates are same as those of received data 1051 and then those having a lowest priority based on the condition that the number of input items included in the picked up template candidates is same as that of received data 1051. In the example in FIG. 10, the template candidates include the templates 1040C, 1040A and 1040B having priority in this order.

If the number of the template candidates is one during the picking up process, the picking up process is terminated.

Instead of the priority order, the templates may be ordered with priority by the selecting process. In this case, the priority order of the template 1040 becomes higher as the template 1040 has a greater degree of matching conditions.

A delimiter candidate having a highest priority, a print start data candidate having a highest priority and a template candidate having a highest priority are provisionally determined as provisional candidates. Item data included in the received data 1051 from the host apparatus 1039 is presumed using the provisional candidates for a delimiter, print start data and a template. The LCD 1023 displays the print preview 1061 which shows a state where the item data is input to the template 1040.

At this time, if the print preview 1061 displayed on the LCD 1023 is in a most appropriate state desired by the user, the user operates an operation key 1021 so as to determine the current provisional candidates as a delimiter, print start data and a template and print a print tape 1052 as shown by the print preview 1061.

On the other hand, if the print preview 1061 displayed on the LCD 1023 is not in a most appropriate state desired by the user, the user operates the operation key 1021 so as to show another print preview 1061 on the LCD 1023. At this time, when the user operates the operation key 1021, any one of the provisional candidates which are provisionally determined as the delimiter, the print start data and the template is changed according to the priority order. Especially, when the provisional delimiter candidate is changed according to the priority order, a new print start data candidate is obtained and a new template candidate is picked up based on the changed provisional delimiter candidate.

In the printing apparatus 1001 shown in FIG. 10, when the user operates the operation key 1021, a combination of the provisional candidates which are provisionally determined is changed. Therefore, if the user repeats the operation of the operation key 1021, the LCD 1023 displays each print preview 1061 one by one. If the print preview 1061 displayed on the LCD 1023 is in an appropriate state, the user operates the operation key 1021 so as to determine the current provisional candidates as a delimiter, print start data and a template and print a print tape 1052 as shown by the print preview 1061.

FIG. 11 shows the print preview 1061 shown on the LCD 1023 when "/" is the provisional delimiter candidate having the highest priority order. As described before, the print start data candidate which is obtained based on the delimiter candidate "/" having the highest priority order is only "CR" and the template candidates which are obtained based on the delimiter candidate "/" having the highest priority order are the templates 1040C, 1040A and 1040B. Therefore, the three types of print previews 1061 are displayed on the LCD 1023. FIG. 11 shows the three types of print previews 1061A, 1061B and 1061C.

The print preview 1061A is shown on the LCD 1023 when the delimiter candidate "/", the print start data candidate "CR" and the template 1040C which is the template candidate are provisionally determined to be the provisional candidates. The print preview 1061A is shown in FIG. 10 as the print preview 1061.

The print preview 1061B is shown on the LCD 1023 when the delimiter candidate "/", the print start data candidate "CR" and the template 1040A which is the template candidate are provisionally determined to be the provisional candidates.

The print preview 1061C is shown on the LCD 1023 when the delimiter candidate "/", the print start data candidate "CR" and the template 1040B which is the template candidate are provisionally determined to be the provisional candidates.

An upper end portion of each print preview 1061 shows an arrow showing that there are other print previews 1061.

[Explanation of a Configuration of the Printing Apparatus]

Figure 12:
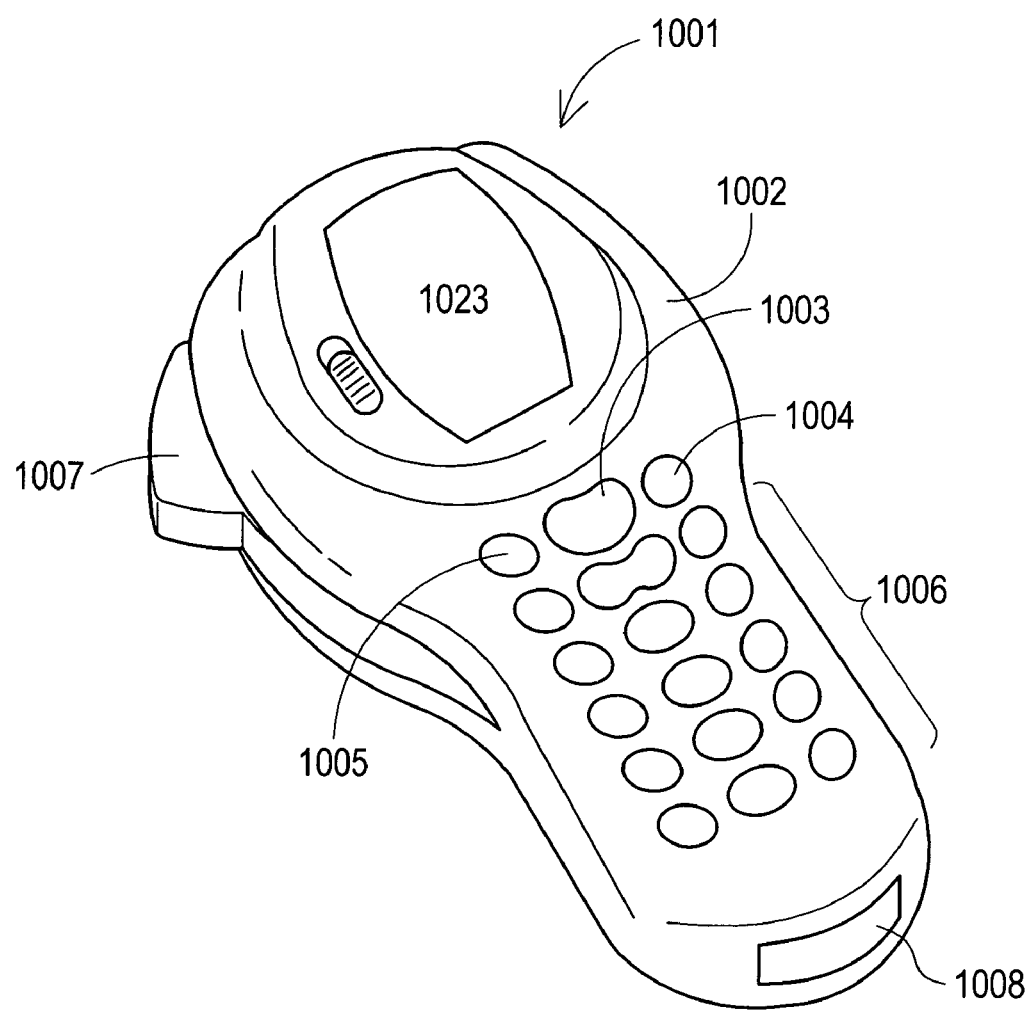
FIG. 12 is an outer perspective view showing the printing apparatus according to the third embodiment.
Figure 13:
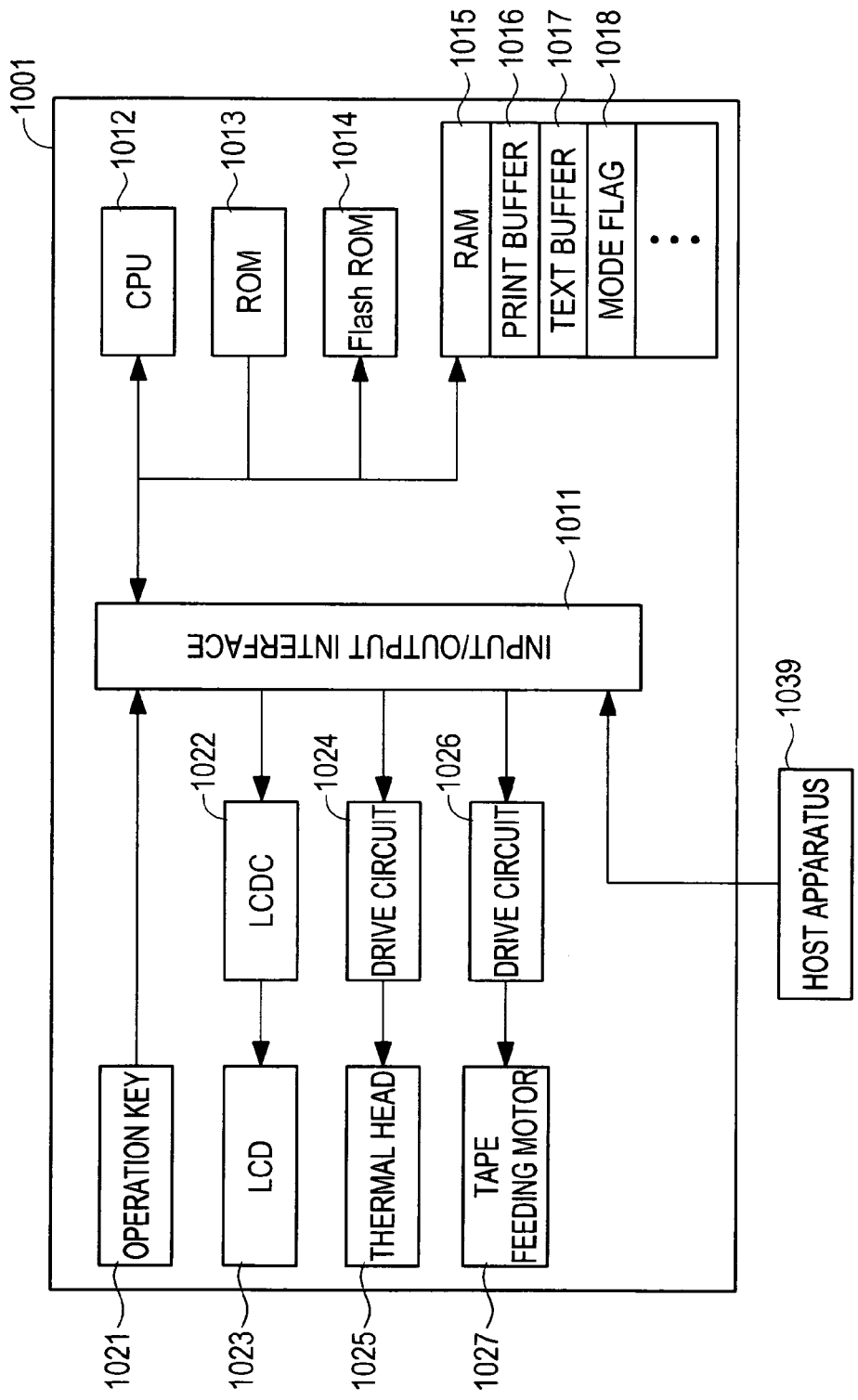
FIG. 13 is a block diagram showing a control system of the printing apparatus according to the third embodiment.

A configuration of the printing apparatus 1001 according to the third embodiment will be explained. As shown in FIG. 12, the printing apparatus 1001 of the third embodiment is a handy type label printer. A command key 1003, an upward key 1004, a downward key 1005, editing keys 1006, a manual lever 1007 for cutting the print tape 1052, a connection port 1008 for receiving a connector of a cable for connecting the printing apparatus 1001 to the host apparatus 1039, the LCD 1023 and the like are arranged on a body frame 1002 of the printing apparatus 1001. The operation key 1021 is comprised of the command key 1003, the upward key 1004, the downward key 1005 and the editing keys 1006.

A CPU 1012 for executing each of programs which will be described later, a ROM 1013, a flash ROM 1014, a RAM 1015 and the like are connected to an input/output interface 1011 of the printing apparatus 1001 of the third embodiment.

The ROM 1013 stores various programs which will be described later. The flash ROM 1014 stores information relating to the templates 1040A, 1040B, 1040C. The RAM 1015 includes a print buffer 1016, a text buffer 1017 and a work area which stores a mode flag 1018 and is used when the CPU 1012 executes each of the programs. A variable a, a variable x, a variable y, a variable z, a variable i, a variable j and a variable k are set in the work area.

In the printing apparatus 1001 of the third embodiment, the operation key 1021, a display controller (referred to LCDC) 1022, a drive circuit 1024, a drive circuit 1026 and the like are connected to the input/output interface 1011. The display controller 1022 has a display RAM for outputting display data to the LCD 1023. The drive circuit 1024 drives a thermal head 1025. The drive circuit 1026 drives a tape feeding motor 1027 which feeds the print tape 1052 from a print cassette to outside. The host apparatus 1039 is connected to the input/output interface 1011 via a cable whose connector is inserted to the connection port 1008.

[Explanation of Operation Control]

Next, control operations of the printing apparatus 1001 of the third embodiment will be explained.

Figure 14:
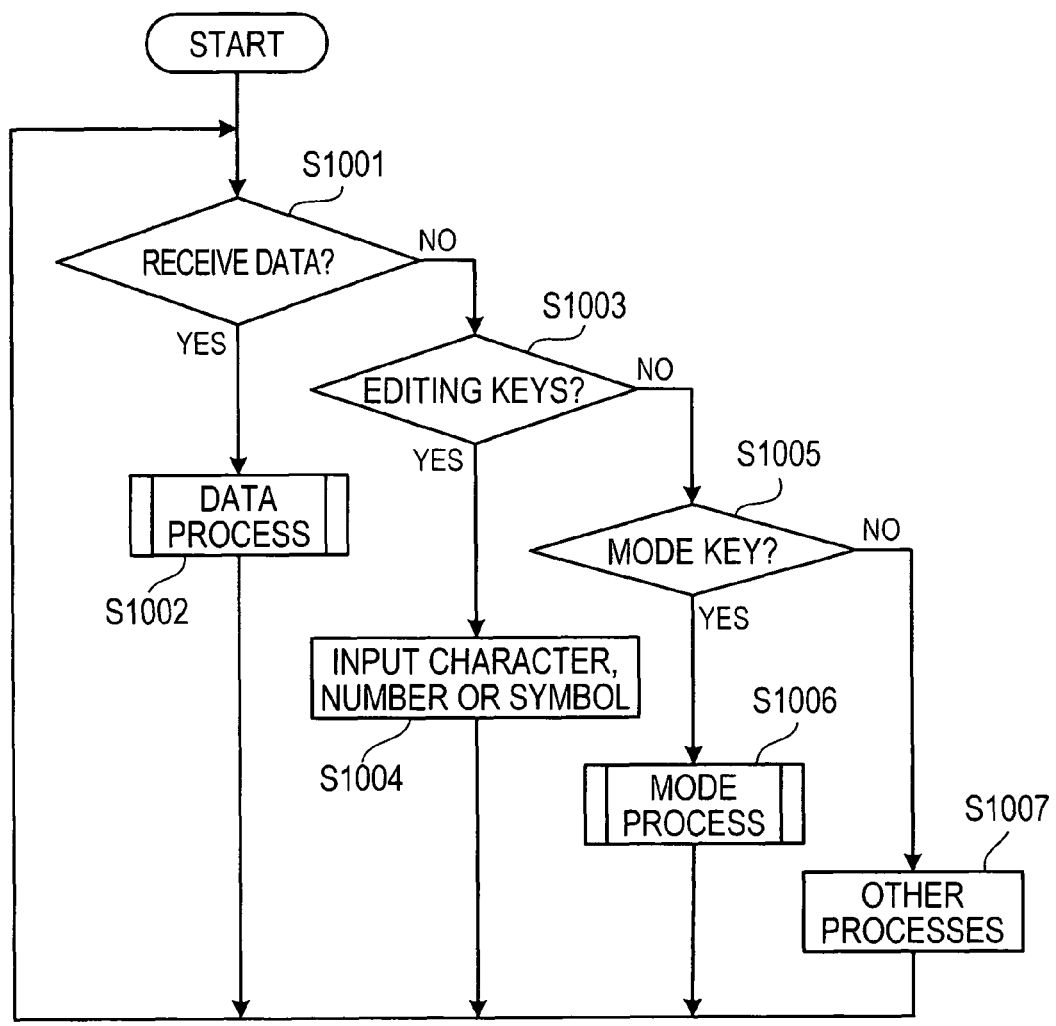
FIG. 14 is a flowchart of a main program.

When the CPU 1012 reads and executes the main program, it is determined whether or not the CPU 1012 receives data from the host apparatus 1039 in step S1001, as shown in FIG. 14. If it is determined that the CPU 1012 received data from the host apparatus 1039 (S1001: YES), the data process of step S1002 which will be described later is executed and the routine returns to step S1001. The CPU 1012 stores the received data 1051 from the host apparatus 1039 in the work area of the RAM 1015. On the other hand, if it is determined that the CPU 1012 does not receive data from the host apparatus 1039 (S1001: NO), the routine proceeds to step S1003.

In step S1003, the CPU 1012 determines whether or not any one of editing keys is operated by the user. The editing keys means the operation keys 1021 except for the command key 1003. If it is determined that any one of the editing keys is operated by the user (S1003: YES), the routine proceeds to step S1004. After a character, a number or a symbol is input by the operation of the editing keys by the user in step S1004, the routine returns to step S1001. The input of a character, a number or a symbol by the operation of the editing keys by the user means inputting or editing a content to be printed, which has been known, and therefore detailed explanation thereof will be omitted. If it is determined that any one of the editing keys is not operated by the user (S1003: NO), the routine proceeds to step S1005.

In step S1005, the CPU 1012 determines whether or not a mode key is operated by the user. The mode key means the command key 1003. If it is determined that the mode key is operated by the user (S1005: YES), the routine returns to step S1001 after executing the mode process of step S1006 which will be described later. On the other hand, if it is determined that the mode key is not operated by the user (S1005: NO), the routine proceeds to step S1007 and returns to step S1001 after executing other processes.

The mode process of step S1006 will be explained.

Figure 15:
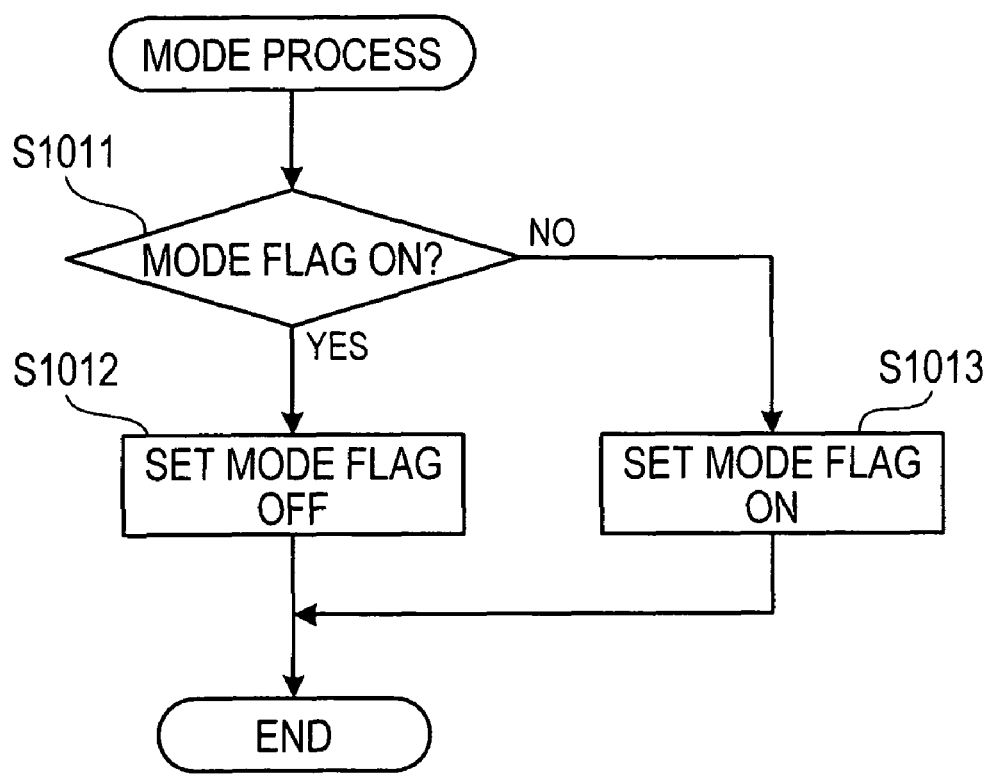
FIG. 15 is a flowchart of a mode process.

When the mode process of step S1006 is executed in the main program, the CPU 1012 determines whether or not the mode flag 1018 is on in step S1011 shown in FIG. 15. The mode flag 1018 is set in the RAM 1015 and the initial state of the mode flag 1018 is off. If it is determined that the mode flag 1018 is on (S1011: YES), the routine proceeds to step S1012. In step S1012, the CPU 1012 sets the mode flag 1018 to be off and the routine returns to step S1001 in the main program. On the other hand, if it is determined that the mode flag 1018 is not on (S1011: NO), the routine proceeds to step S1013. In step S1013, the CPU 1012 sets the mode flag 1018 to be on and the routine returns to step S1001 in the main program.

The data processing of step S1002 in the main program will be explained.

Figure 16:
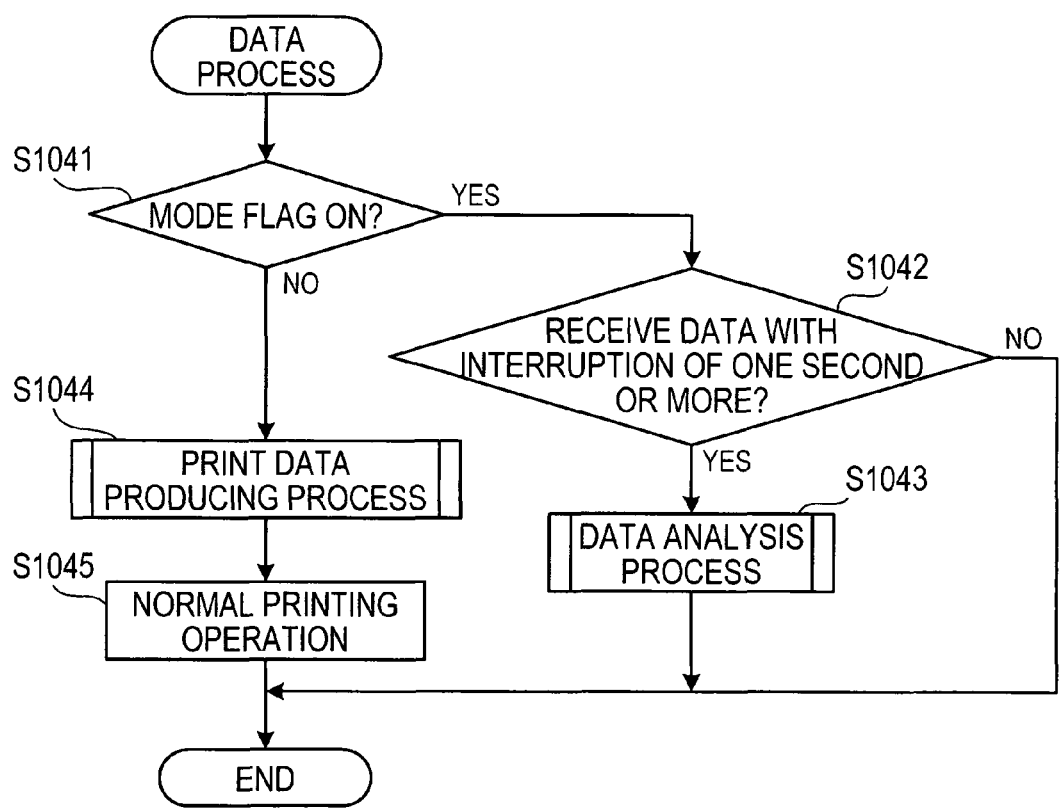
FIG. 16 is a flowchart of a data process.

When the data processing of step S1002 in the main program is executed, the CPU 1012 determines whether or not the mode flag 1018 is on in step S1041 shown in FIG. 16. If it is determined that the mode flag 1018 is on (S1041: YES), the routine proceeds to step S1042. In step S1042, the CPU 1012 determines whether or not the CPU 1012 receives the data received in step S1001 of the main program with interruption of one or more than one second. If it is determined that the CPU 1012 receives the data received in step S1001 in the main program without interruption of one or more than one second (S1042: NO), the CPU 1012 performs nothing and the routine returns to step S1001 in the main program. On the other hand, if it is determined that the CPU 1012 receives the data received in step S1001 in the main program with interruption of one or more than one second (S1042: YES), the routine proceeds to step S1043. In step S1043, the CPU 1012 executes the data analysis process which will be described later and then the routine returns to step S1001 in the main program. On the other hand, if it is determined that the mode flag 1018 is not on (S1041: NO), the routine proceeds to step S1044. In step S1044, the CPU 1012 executes the print data producing process which will be described later and the routine proceeds to step S1045. In step S1045, the CPU 1012 executes a normal printing operation and the routine returns to step S1001 in the main program. During the normal printing operation, the CPU 1012 drives the tape feeding motor 1027 via the drive circuit 1026 so as to feed the print tape 1052 to the outside of the print cassette and the CPU 1012 prints a print image, which is developed in the print buffer 1016, on the print tape 1052 stored in the print cassette with the thermal head 1025 which is driven via the drive circuit 1024.

Next, the data analysis processing of step S1043 in the data processing shown in FIG. 16 will be explained.

Figure 17:
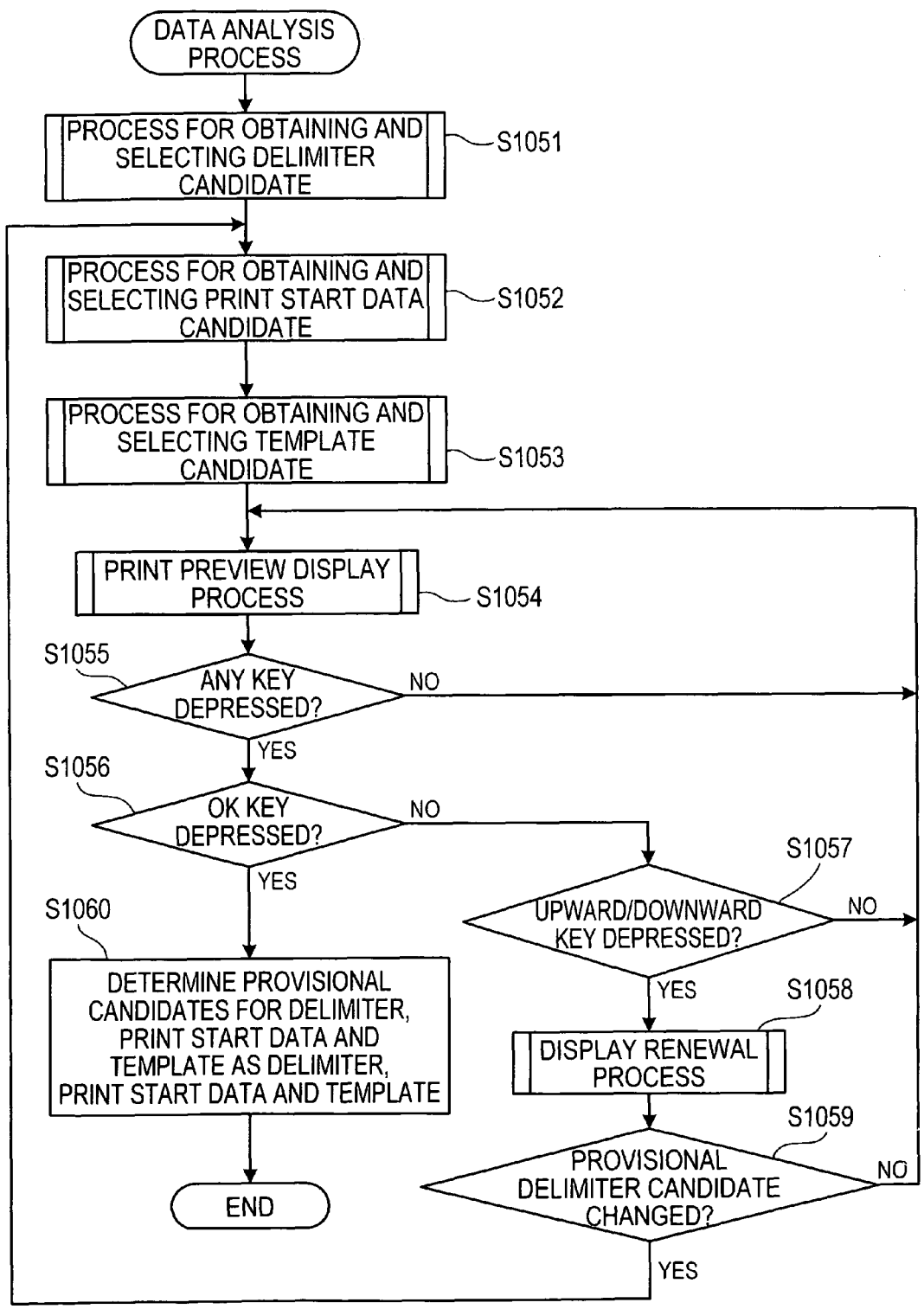
FIG. 17 is a flowchart of a data analysis process.

If the data analysis processing of step S1043 in the data processing shown in FIG. 16 is executed, the CPU 1012 obtains and selects a delimiter candidate in step S1051 as shown in FIG. 17.

A process for obtaining and selecting a delimiter candidate will be explained.

Figure 18:
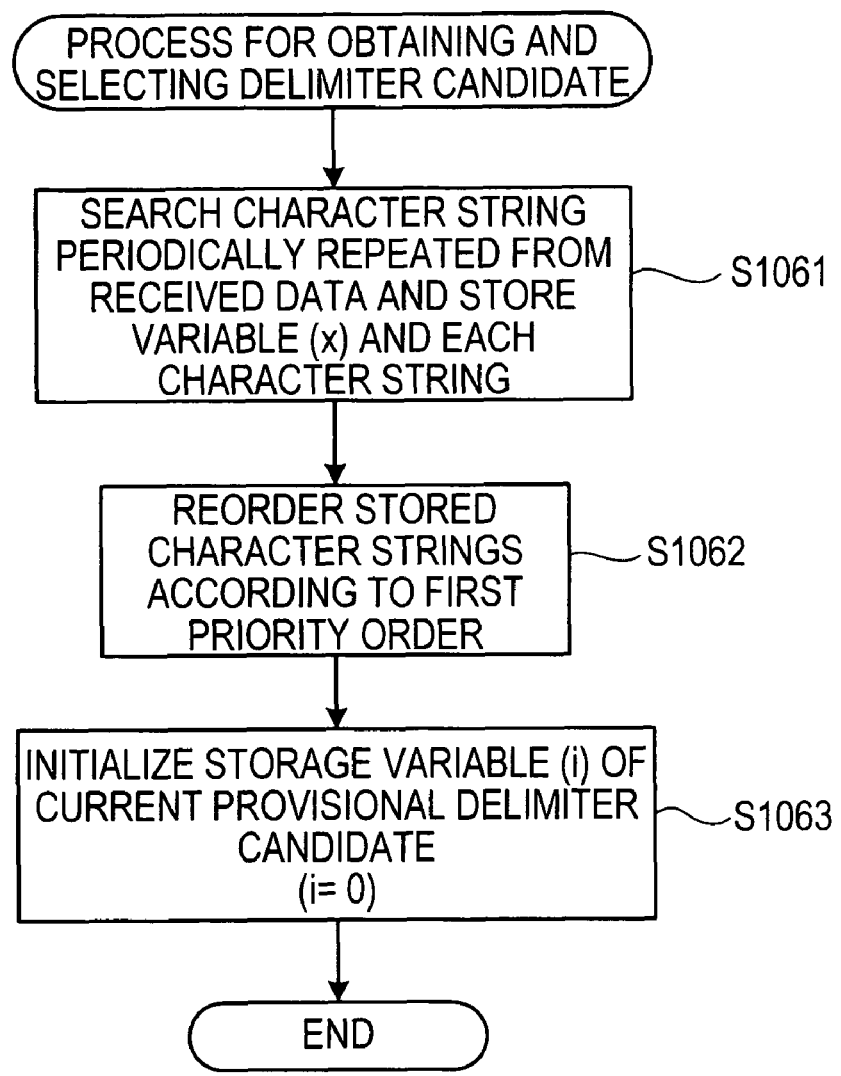
FIG. 18 is a flowchart of a delimiter candidate obtaining and selecting process.

When executing the delimiter candidate obtaining and selecting process of step S1051 in the data analysis process shown in FIG. 17, the CPU 1012 searches a character string which is periodically repeated from the received data as a delimiter candidate based on the first predetermined rule in step S1061 as shown in FIG. 18. In the example shown in FIG. 10, the CPU 1012 searches "/", ".", ":" and "CR". The PCU 1012 stores the candidates for each delimiter (the searched character strings) and the number of the candidates for delimiters as the variable x in the work area of the RAM 1015. In the example shown in FIG. 10, the variable x is "4".

The CPU 1012 reorders the delimiter candidates according to the first priority order based on the first predetermined rule in step S1062 and restores the reordered delimiter candidates in the work area of the RAM 1015. In the example shown in FIG. 10, the delimiter candidates "/",".",":" and "CR" are stored in the work area in this order. Further, the CPU 1012 initializes a storage variable i of the current provisional delimiter candidate (i=0) in step S1063. The order number set to the storage variables i of the current provisional delimiter candidate corresponds to the order number of the delimiter candidate which has been reordered based on the first predetermined rule (the first priority order). Therefore, in the example shown in FIG. 10, if the storage variable i of the current provisional delimiter candidate is "0", the delimiter candidate corresponds to "/", if the storage variable i of the current provisional delimiter candidate is "1", the delimiter candidate corresponds to ".", if the storage variable i of the current provisional delimiter candidate is "2", the delimiter candidate corresponds to ":", and if the storage variable i of the current provisional delimiter candidate is "3", the delimiter candidate corresponds to "CR".

Thereafter, the CPU 1012 returns to the data analysis process shown in FIG. 17 and executes the process for obtaining and selecting print start data candidates in step S1052.

The process for obtaining and selecting print start data candidates will be explained.

Figure 19:
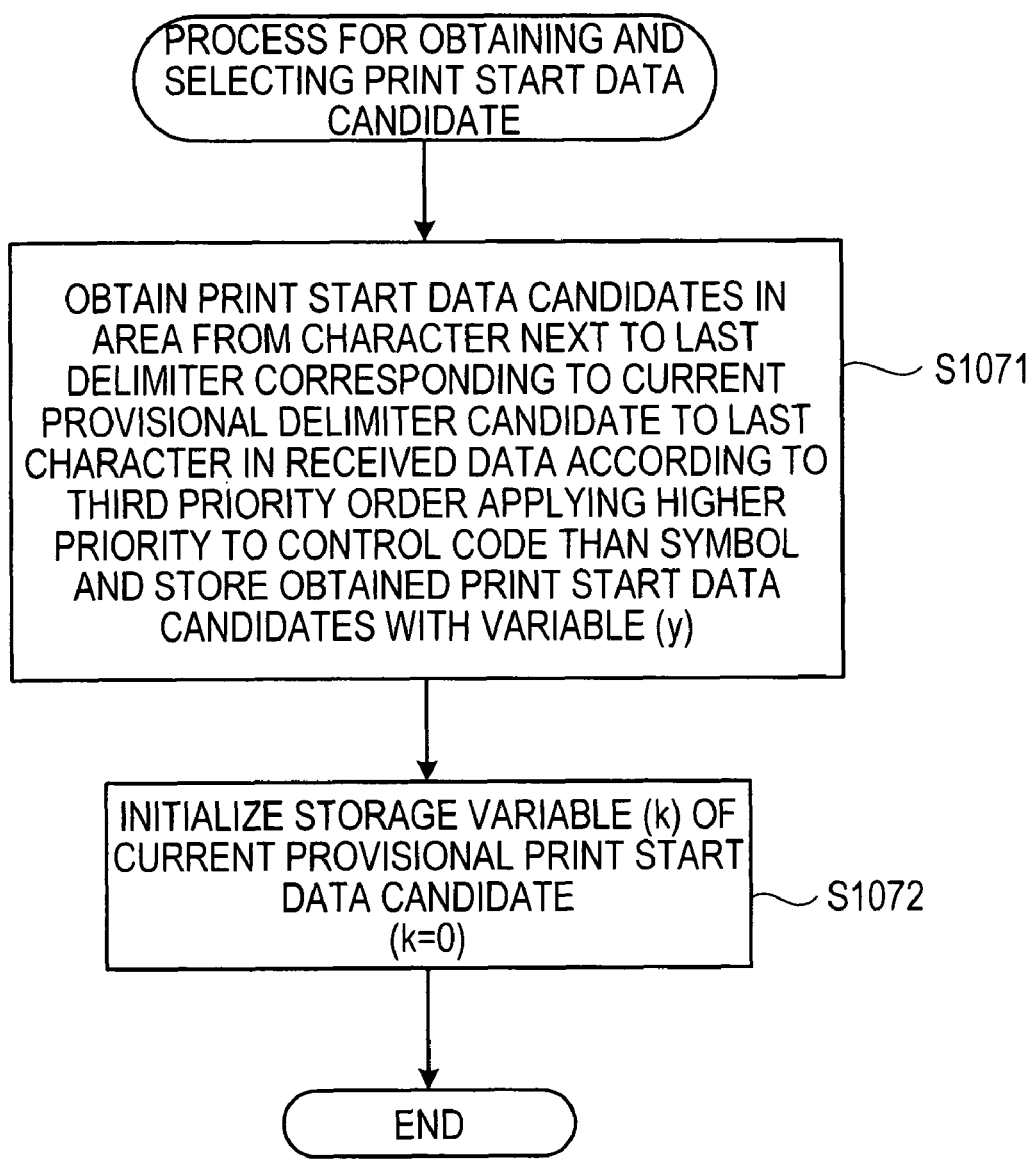
FIG. 19 is a flowchart of a print start data candidate obtaining and selecting process.

When executing the process for obtaining and selecting print start data candidates of S1052 in the data analysis process shown in FIG. 17, the CPU 1012 searches the print start data candidates from the received data in step S1071 as shown in FIG. 19. The CPU 1012 searches the print start data candidates from an area covering from a character next to the last delimiter corresponding to the delimiter candidate which is specified by the storage variable i of the current provisional delimiter candidate to the last character in the received data. The CPU 1012 searches the print start data candidates from the area based on the third predetermined rule with providing higher priority to a control code than a symbol. In the example shown in FIG. 10, if the storage variable i of the current provisional delimiter candidate is "0", the delimiter candidate corresponds to "/" and the CPU 1012 searches "CR". The CPU 1012 stores the print start data candidate and the number of the print start data candidates as the variable y in the work area of the RAM 1015.

The print start data candidates are stored in the work area according to the third priority order. In the example shown in FIG. 10, the variable y is "1".

The CPU 1012 initializes the storage variable k of the current provisional print start data candidate (k=0) in step S1072. The order number set to the storage variable k of the current provisional print start data candidates corresponds to the order number of the print start data candidate stored based on the third predetermined rule (the third priority order).

Therefore, in the example shown in FIG. 10, if the storage variable i of the current provisional delimiter candidate is "0" and the storage variable k of the current provisional print start data candidates is "0", the print start data candidate corresponds to "CR".

Thereafter, the routine returns to the data analysis process of FIG. 17 and the CPU 1012 executes the process for obtaining and selecting template candidates of step S1053.

Figure 20:
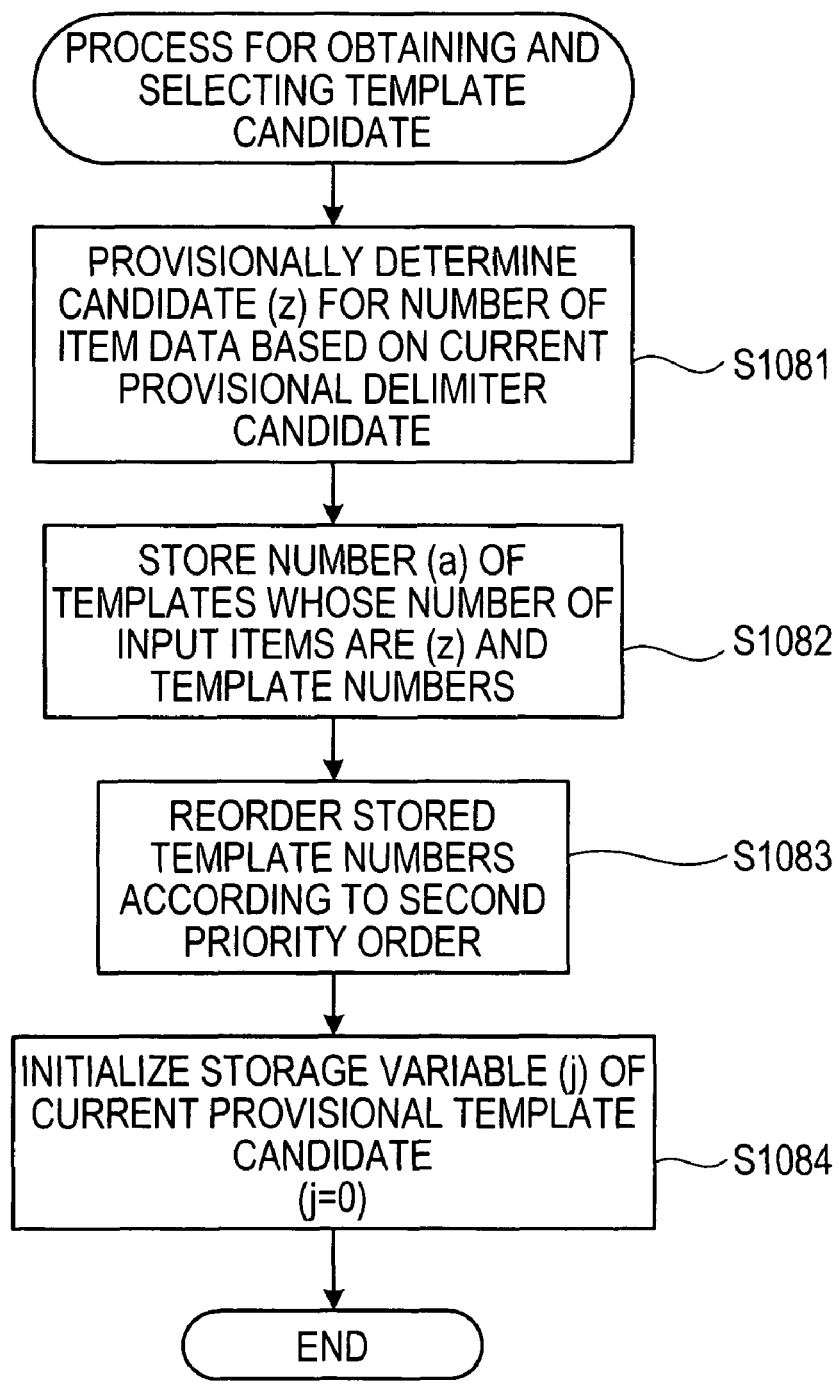
FIG. 20 is a flowchart of a template candidate obtaining and selecting process.

The process for obtaining and selecting template candidates will be explained. When executing the process for obtaining and selecting template candidates of step S1053 in the data analysis process shown in FIG. 17, in step S1081 of FIG. 20, the CPU 1012 provisionally determines the number of item data in the received data based on the delimiter candidates specified by the storage variable i of the current provisional delimiter candidate. In the example shown in FIG. 10, if the storage variable i of the current provisional delimiter candidate is "0", the delimiter candidate corresponds to "/". Therefore, the CPU 1012 sets the number of item data candidate to "4". The CPU 1012 stores the number of item data candidate as the variable z in the work area of the RAM 15.

In step S1082, the CPU 1012 searches thirty or less than thirty templates 1040 having the same number of input items as the variable z as the template candidates with the pick up method. In the example shown in FIG. 10, when the storage variable i of the current provisional delimiter candidate is "0" and the delimiter candidate is "/", the variable z is "4". Therefore, the CPU 1012 searches the templates 1040A, 1040C and 1040B where the number of input items is "4". The CPU 1012 stores a specified number of each template candidate and the number of searched templates 1040 as the variable a in the work area of the RAM 1015. In the example, since the templates 1040A, 1040B and 1040C are searched as the template candidates, the variable a is "3".

In step S1083, the CPU 1012 reorders the specified numbers of the template candidates according to the second priority order based on the second predetermined rule and restores the reordered specified numbers of the template candidates in the work area of the RAM 1015. In the example, the specified numbers of the templates 1040C, 1040A and 1040B are restored in the work area in this order. Further, in step S1084, the CPU 1012 initializes the storage variable j of the current provisional template candidate (j=0). The order number set to the storage variable j of the current provisional template candidates corresponds to the order number (the second priority order) of the specified number of the template candidates which have been reordered according to the second predetermined rule. Therefore, in the example, if the storage variable j of the current provisional template candidate is "0", the template candidate corresponds to the template 1040C, and if the storage variable j of the current provisional template candidate is "1", the template candidate corresponds to the template 1040A, and if the storage variable j of the current provisional template candidate is "2", the template candidate corresponds to the template 1040B.

Thereafter, the routine returns to the data analysis process of FIG. 17 and the CPU 1012 executes the print preview display process of step S1054.

Figure 22:
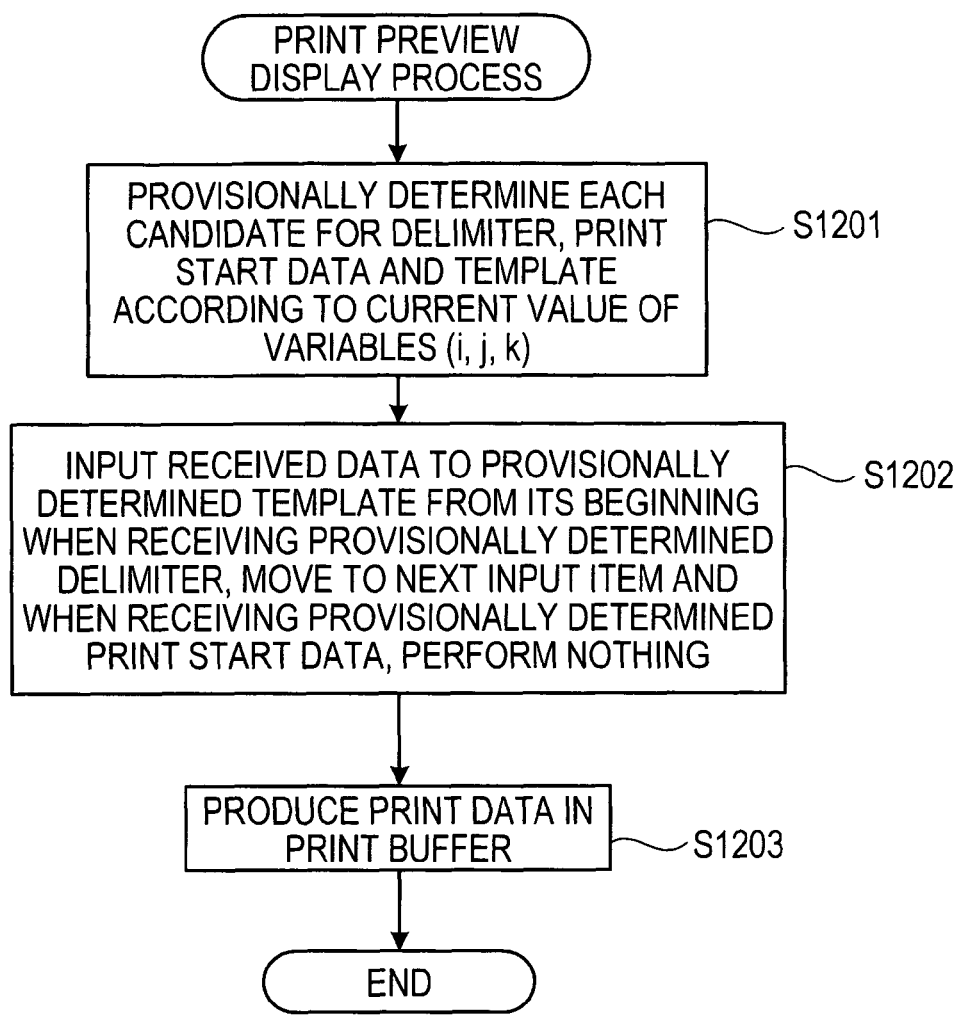
FIG. 22 is a flowchart of a print display preview process.

The print preview display process will be explained. When executing the print preview display process of step S1054 in the data analysis process of FIG. 17, in step S1201 shown in FIG. 22, the CPU 1012 provisionally determines a provisional delimiter candidate according to the storage variable i of the current provisional delimiter candidate, and provisionally determines a provisional print start data candidate according to the storage variable k of the current provisional print start data candidate, and provisionally determines a provisional template candidate according to the storage variable j of the current provisional template candidate. In the example, since each of the storage variables i, j and k is set to "0" (S1063, S1072, S1084), "/" is provisionally determined to be a provisional delimiter candidate, "CR" is provisionally determined to be a provisional print start data candidate, and the template 1040C is provisionally determined to be a provisional template candidate.

In step S1202, the CPU 1012 inputs data from the beginning of the received data to the first input item of the template 1040 which is provisionally determined as a provisional template candidate. At this time, when receiving the delimiter which is provisionally determined as a provisional delimiter candidate, the CPU 1012 moves to the next input item on the template 1040 and continuously inputs the received data. The CPU 1012 moves to the next input item on the template 1040 whenever receiving a delimiter which is provisionally determined as a provisional delimiter candidate. However, if receiving print start data which is provisionally determined as a provisional print start data just after the delimiter, the CPU 1012 performs nothing.

In the example, the CPU 1012 inputs the received data 1051 which is "2006.12.25/9:30/3/12CR" from its beginning to the input item 1041C of the template 1040C which has been provisionally determined as a provisional template candidate. At this time, when receiving "/" which has been provisionally determined as a provisional delimiter candidate, the CPU 1012 moves to the next input item 1042C of the template 1040C and continuously inputs the received data 1051. As a result, "2006.12.25" is input to the input item 1041C of the template 1040C. Thereafter, when receiving "/" which has been provisionally determined as a provisional delimiter candidate, the CPU 1012 moves to the next input item 1043C of the template 1040C and continuously inputs the received data 1051. As a result, "9:30" is input to the input item 1042C of the template 1040C. Thereafter, when receiving "/" which has been provisionally determined as a provisional delimiter candidate, the CPU 1012 moves to the next input item 1044C of the template 1040C and continuously inputs the received data 1051. As a result, "3" is input to the input item 1043C of the template 1040C. Thereafter, since the CPU 1012 receives "CR" which is a provisional print start data candidate, "12" is input to the input item 1044C of the template 1040C. The CPU 1012 stores thus produced print data in the text buffer 1017.

Thereafter, the CPU 1012 proceeds to step S1203 and the LCD 1023 displays the print preview of the print image developed in the print buffer 1016. In the example, the LCD 1023 displays the print preview 1061A shown in FIG. 11.

Thereafter, the CPU 1012 returns to the data analysis process of FIG. 17 and proceeds to step S1055. In step S1055, the CPU 1012 waits until any one of the operation keys 1021 is depressed (S1055: NO). When any one of the operation keys 1021 is depressed (S1055: YES), the routine proceeds to step S1056.

In step S1056, the CPU 1012 determines whether or not the operation key 1021 depressed in step S1055 is an OK key. The OK key is the command key 1003 (commonly used with the mode key). If it is determined that the operation key 1021 depressed in step S1056 is not the OK key (S1056: NO), the routine proceeds to step S1057.

In step S1057, the CPU 1012 determines whether or not the upward key 1004 or the downward key 1005 is depressed. If none of the upward key 1004 and the downward key 1005 is depressed (S1057: NO), the routine returns to step S1054. On the other hand, if it is determined that any one of the upward key 1004 and the downward key 1005 is depressed (S1057: YES), the routine proceeds to the display renewal process of step S1058.

The display renewal process of step S1058 will be explained.

Figure 21:
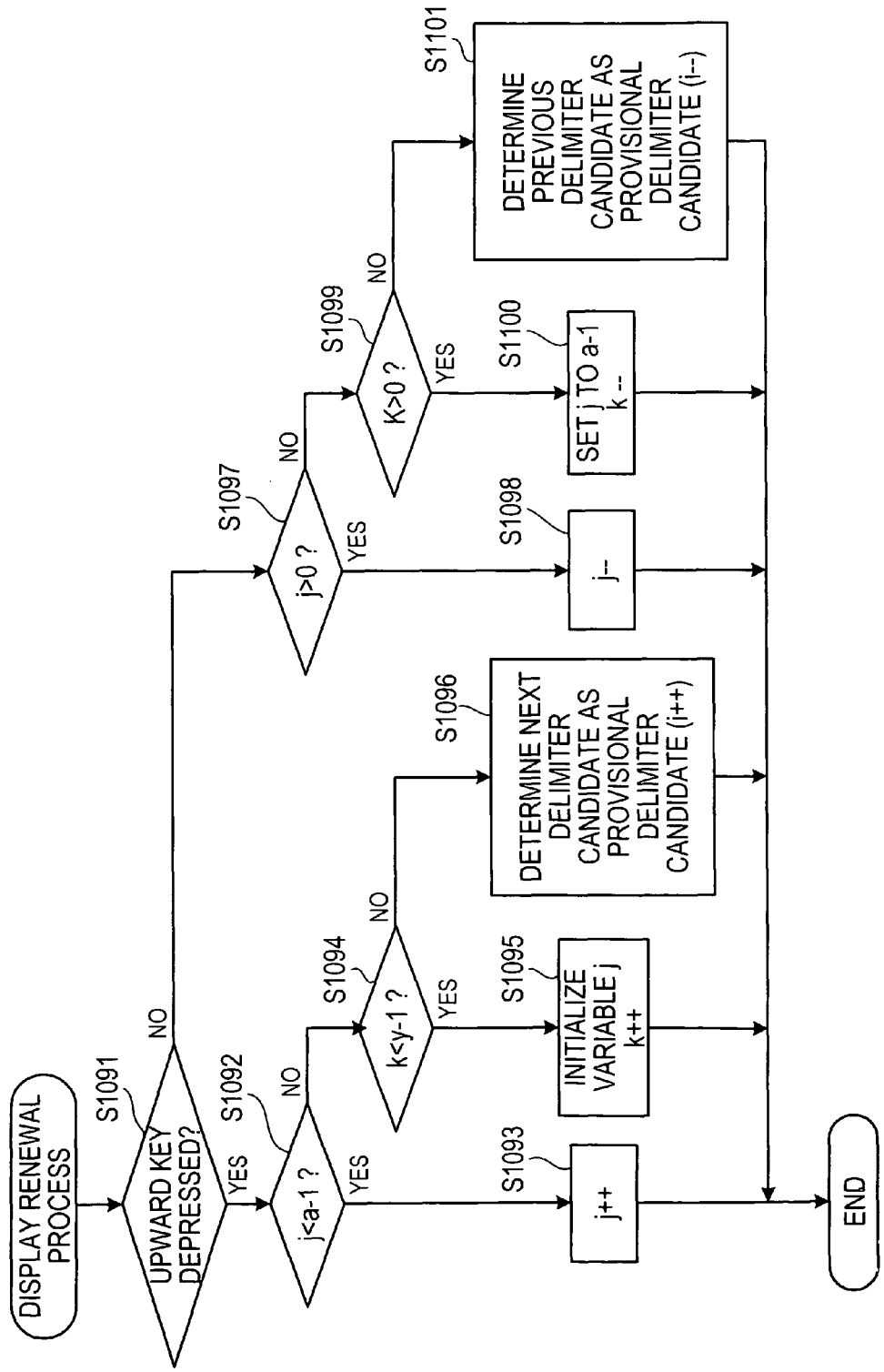
FIG. 21 is a flowchart of a display renewal process.

When the display renewal process of step S1058 is executed, the CPU 1012 determines whether or not the upward key 1004 is depressed in step S1091 of FIG. 21. If it is determined that the upward key 1004 is depressed (S1091: YES), the routine proceeds to step S1092. In step S1092, the CPU 1012 determines whether or not the value of the storage variable j of the current provisional template candidate is smaller than the value obtained by subtracting "1" from the value of the variable a which represents the number of template candidates. If it is determined that the value of the variable j is smaller than the value obtained by subtracting "1" from the value of the variable a (S1092: YES), the routine proceeds to step S1093. In step S1093, the CPU 1012 increments the value of the variable j. Then, the routine returns to the data analysis process of FIG. 17 and proceeds to S1059.

On the other hand, in step S1092, if it is determined that the value of the variable j is equal to or greater than the value obtained by subtracting "1" from the value of variable a (S1092: NO), the routine proceeds to step S1094. In step S1094, the CPU 1012 determines whether or not the value of the variable k of the current provisional print start data candidate is smaller than the value obtained by subtracting "1" from the value of the variable y which represents the number of print start data candidates. If it is determined that the value of the variable k is smaller than the value obtained by subtracting "1" from the value of the variable y (S1094: YES), the routine proceeds to step S1095. In step S1095, the CPU 1012 initializes the variable j (j=0) and increments the value of the variable k. Thereafter, the routine returns to the data analysis process of FIG. 17 and proceeds to S1059.

In step S1094, if it is determined that the value of the variable k is equal to or greater than the value obtained by subtracting "1" from the value of the variable y (S1094: NO), the routine proceeds to step S1096. In step S1096, the CPU 1012 increments the storage variable i of the current provisional delimiter candidate so as to provisionally determine the next delimiter candidate as a provisional delimiter candidate. Thereafter, the routine returns to the data analysis process of FIG. 17 and proceeds to S1059.

In step S1091, when it is determined that the upward key 1004 is not depressed (S1091: NO), the routine proceeds to step S1097. In step S1097, the CPU 1012 determines whether or not the value of the variable j is greater than "0". If it is determined that the value of the variable j is greater than "0" (S1097: YES), the routine proceeds to step S1098. In step S1098, the CPU 1012 decrements the value of the variable j. Thereafter, the routine returns to the data analysis process of FIG. 17 and proceeds to S1059.

In step S1097, if it is determined that the value of variable j is "0" (S1097: NO), the routine proceeds to step S1099. In step S1099, the CPU 1012 determines whether or not the value of the variable k is greater than "0". If it is determined that the value of the variable k is greater than "0" (S1099: YES), the routine proceeds to step S1100. In step S1100, the CPU 1012 sets the value obtained by subtracting "1" from the value of variable a to the variable j and decrements the value of the variable k. Thereafter, the routine returns to the data analysis process of FIG. 17 and proceeds to S1059.

In step S1099, if it is determined that the value of the variable k is "0" (S1099: NO), the routine proceeds to step S1101. In step S1101, the CPU 1012 decrements the value of the variable i so as to provisionally determine the previous delimiter candidate as a provisional delimiter candidate. Thereafter, the routine returns to the data analysis process of FIG. 17 and proceeds to step S1059.

Therefore, when the display renewal process is executed in the case of FIG. 10, by depression of the upward key 1004 or the downward key 1005, in case of that the value of the variable i is "0", each of the values (j, k) of the variables j and k is set to be any of combinations of (0, 0), (1, 0), and (2, 0). By executing the display renewal process, the combination of the values (i, j, k) of the variables i, j and k is changed. Thereafter, the routine returns to the data analysis process of FIG. 17 and proceeds to step S1059.

Returning to the data analysis process of FIG. 17 and proceeding to step S1059, the CPU 1012 determines whether or not the provisional delimiter candidate is changed. In this determination, if the value of the variable i is changed in the display renewal process of step S1058, it is determined that the provisional delimiter candidate is changed. If it is determined that the provisional delimiter candidate is not changed (S1059: NO), the print preview display process of step S1054 is executed again. Accordingly, when step S1201 in FIG. 22 is executed again, the provisional print start data candidate or the provisional template candidate is changed.

On the other hand, in step S1059 in FIG. 17, if it is determined that the provisional delimiter candidate is changed (S1059: YES), the process for obtaining and selecting a print start data candidate of step S1052 or the process for obtaining and selecting a template candidate of step S1053 is executed again. Accordingly, a print start data candidate or a template candidate corresponding to the changed provisional delimiter candidate is obtained. Thereafter, the print preview display process of step S1054 is executed again. Accordingly, when step S1201 in FIG. 22 is executed again, the changed provisional candidates for a delimiter, print start data and a template are provisionally determined again.

The routine returns to the data analysis process of FIG. 17 and if it is determined that the operation key 1021 depressed in step S1055 is the OK key in step S1056 (S1056: YES), the routine proceeds to step S1060. In step S1060, the CPU 1012 determines the current provisional delimiter candidate as the delimiter and determines the current provisional print start data candidate as the print start data and determines the current provisional template candidate as the template. Thereafter, the routine returns to step S1001 of the main program shown in FIG. 14.

The print data producing process of step S1044 in the data process of FIG. 16 will be explained.

Figure 23:
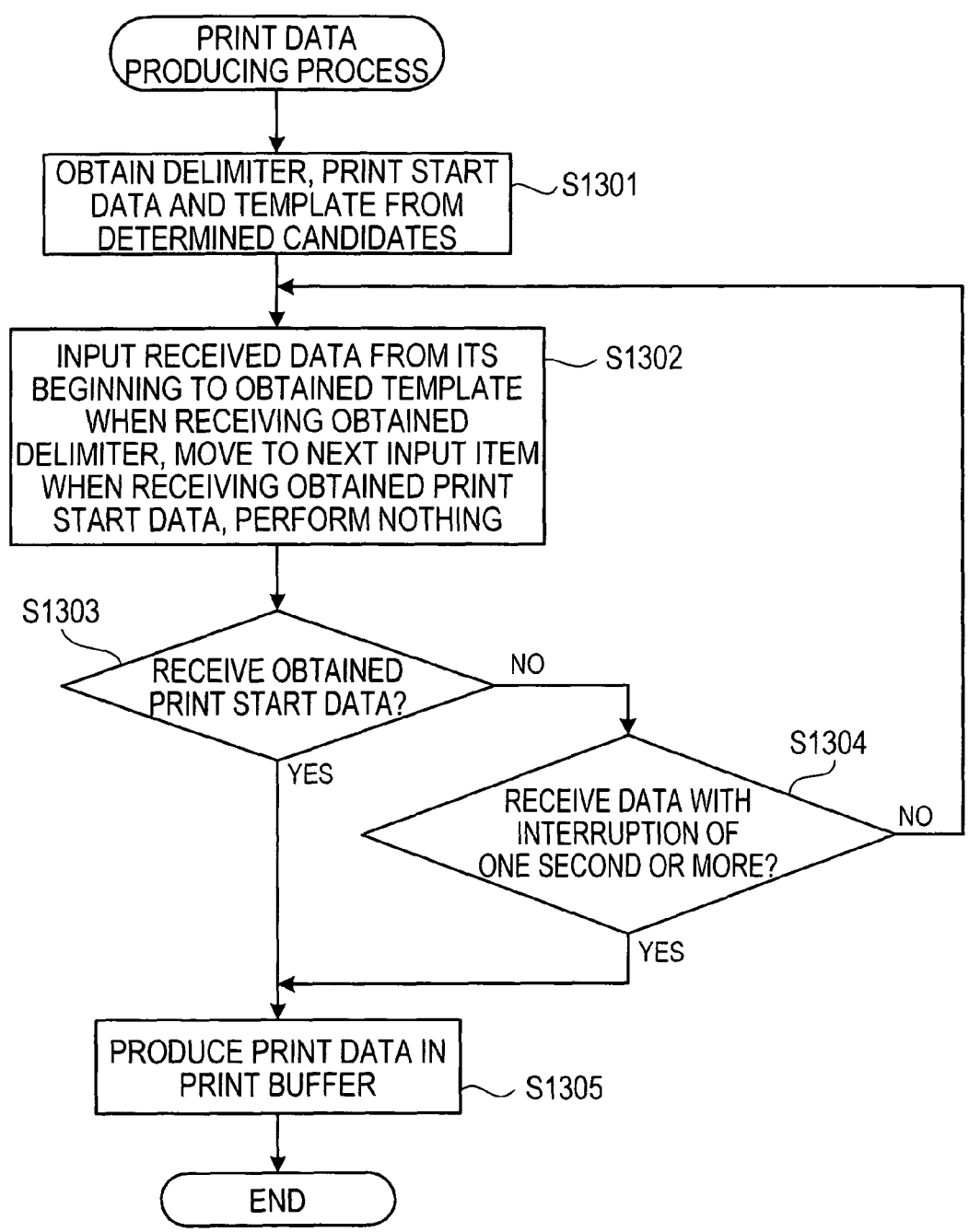
FIG. 23 is a flowchart of a print data producing process.

When the print data producing process of step S1044 is executed, in step S1301 as shown in FIG. 23, the CPU 1012 obtains the delimiter, the print start data and the template based on the provisional delimiter candidate, the provisional print start data candidate and the provisional template candidate which are determined in S1060 of FIG. 17.

Then, the CPU 1012 proceeds to S1302 and inputs the received data 1051 from its beginning to the first input item of the template 1040 obtained in step S1301. At this time, when receiving the delimiter obtained in step S1301, the CPU 1012 moves to the next input item on the template 1040 and continuously inputs the received data 1051. The CPU 1012 moves to the next input item on the template 1040 whenever receiving the delimiter obtained in S1301. If receiving the print start data obtained in S1301 just after the delimiter, the CPU 1012 performs nothing.

The CPU 1012 proceeds to step S1303 and determines whether or not the CPU 1012 receives the print start data obtained in S1301. If it is determined that the CPU 1012 receives the print start data obtained in step S1301 (S1303: YES), the CPU 1012 proceeds to step S1305 which will be described later. On the other hand, if it is determined that the CPU 1012 does not receive the print start data obtained in step S1301 (S1303: NO), the CPU 1012 proceeds to step S1304.

In step S1304, the CPU 1012 determines whether or not the CPU 1012 receives data with interruption of one or more than one second. If it is determined that the CPU 1012 receive data with interruption of one or more than one second (S1304: YES), the routine proceeds to step S1305 which will be described later. On the other hand, if it is determined that the CPU 1012 receives data without interruption of one or more than one second (S1304: NO), the routine returns to step S1302 and the CPU 1012 continuously inputs the received data 1051 to the template 1040.

The CPU 1012 stores thus produced print data in the text buffer 1017.

Then, when proceeding to step S1305, the CPU 1012 develops the print data in the print buffer 1016.

In the example, when each value (i, j, k) of the variables i, j and k is (0, 0, 0), the received data 1051 of "2006.12.25/9:30/3/12CR" is input to the input item 1041C of the template 1040C from its beginning, since "/" is determined to be the delimiter, the template 1040C is determined to be the template and "CR" is determined to be the print start data. At this time, when receiving "/" which is a delimiter, the CPU 1012 moves to the next input item 1042C on the template 1040C and continuously inputs the received data 1051. As a result, "2006.12.25" is input to the input item 1041C of the template 1040C. Thereafter, receiving "/" which is a delimiter, the CPU 1021 moves to the next input item 1043C on the template 1040 and continuously inputs the received data 1051. As a result "9:30" is input to the input item 1042C of the template 1040C. Thereafter, receiving "/" which is a delimiter, the CPU 1021 moves to the next input item 1044C and continuously inputs the received data 1051. As a result, "3" is input to the input item 1043C. Thereafter, the CPU 1021 receives "CR" which is print start data. As a result, "12" is input to the input item 1044C of the template 1040C. Accordingly, the print data having the print image of the print preview 1061A shown in FIG. 11 is produced.

When each value (i, j, k) of the variables i, j and k is (0, 1, 0), "/" is determined to be the delimiter, the template 1040A is determined to be the template and "CR" is determined to be the print start data. Accordingly, the print data having a print image of the print preview 1061B shown in FIG. 11 is produced.

When each value (i, j, k) of the variables i, j and k is (0, 2, 0), "/" is determined to be the delimiter, the template 1040B is determined to be the template and "CR" is determined to be the print start data. Accordingly, the print data having a print image of the print preview 1061C shown in FIG. 11 is produced.

Thereafter, the routine returns to the data process of FIG. 16 and proceeds to step S1045. In step S1045, as described above, the print image developed in the print buffer 1016 is printed on the printing tape 1052. Then, the routine returns to step S1001 of the main program.

In the print data producing process, if there is no data relating to the data analysis process of step S1043 in the RAM 1015, normal print data is produced with the template 1040 which is selected by a user. Selection of the template 1040 by a user is performed in other processes (S1007) in the main program shown in FIG. 14.

[SUMMARY]

As explained above, approximately a hundred templates 1040 are stored in the Flash ROM 1014 of the printing apparatus 1001 according to the third embodiment. Each template 1040 includes a plurality of input items. For example, the template 1040C includes four input items 1041C, 1042C, 1043C and 1044C.

When receiving the received data 1051 comprising item data, a delimiter and print start data from the host apparatus 1039 (S1001: YES), the CPU 1021 obtains one or more than one delimiter candidates based on a character string which is periodically repeated in the received data 1051 (S1061), and selects one of the delimiter candidates as a provisional delimiter candidate via the storage variable i of the current provisional delimiter candidate (S1063). Further, based on the provisional delimiter candidate and the received data 1051, a candidate for the number of item data in the received data 1051 is provisionally determined (S1081). The CPU 1021 obtains one or more than one template candidates based on the candidates for the number of item data and each number of input items included in the templates 1040 (S1082). Then, the CPU 1021 selects one of the template candidates as a provisional template candidate via the storage variable j of the current provisional template candidate (S1084). Based on the provisional delimiter candidate and the received data 1051, the CPU 1021 obtains one or more than one print start data candidates (S1071). Then, the CPU 1021 selects one of the print start data candidates as a provisional print start data candidate via the storage variable k of the current provisional print start data candidate (S1072).

Further, based on the provisional candidates for a delimiter, a template and print start data, the received data 1051 is input to the provisional template candidate. Accordingly, print data is produced and the LCD 1023 displays the print preview 1061 which shows the print image corresponding to the print data (S1054, S1201, S1202, S1203).

When a user depresses the upward key 1004 or the downward key 1005 (S1057: YES), one of the provisional candidates for a delimiter, a template or print start data is changed via the corresponding one of the variables i, j and k (S1058). Print data is produced again according to the changed provisional candidate and the LCD 1023 displays the print preview 1061 which shows the print image corresponding to the print data (S1054, S1201, S1202, S1203). For example, the print preview 1061 displayed on the LCD 1023 is renewed to the print preview 1061A or 1061B (see FIG. 11).

On the other hand, when a user depresses the command key 1003 (S1056: YES), each provisional candidate for a delimiter, a template and print start data is determined (S1060), and the print data produced based on each provisional candidate is determined (S1044), and the determined print data is printed on the printing tape 1052 (S1045).

The LCD 1023 displays the print preview 1061 showing a print image corresponding to the print data which is produced based on the provisional candidates for a delimiter, a template and print start data (S1054, S1201, S1202, S1203). Accordingly, a user can check whether or not the received data 1051 is appropriately input to the template 1040 which is provisionally determined to be a template candidate (see FIGS. 10 and 11). If a user changes one of the provisional candidates to another candidate (S1058) by depressing the upward key 1004 or the downward key 1005 after checking (S1057: YES), the LCD 1023 displays the print preview 1061 showing a print image corresponding to the print data which is produced according to the changed candidate (S1054, S1201, S1202, S1203). On the other hand, a user determines each of the provisional candidates (S1060) by depressing the command key 1003 (S1056: YES) after checking, the print data which is produced based on each of the provisional candidates is printed on a printing tape (S1044, S1045).

Therefore, even if the configuration of the received data 1051 or the template 1040 is unknown to a user, the user can easily select a template 1040 where the received data 1051 is appropriately input.

In the printing apparatus 1001 according to the third embodiment, the mode flag 1018 is set to be on or off (S1006) by depressing the command key 1003 (S1005: YES). Only when the mode flag 1018 is on (S1041: YES), the data analysis process of step S1043 is executed. If the mode flag 1018 is off (S1041: NO), the data analysis process of step S1043 is not executed. In this case, if a user knows that the configuration of the received data 1051 and the template 1040 where the received data 1051 is appropriately input are stored, the user sets the mode flag 1018 to be off (S1041: NO) so as to print the received data 1051 quickly (S1044, S1045).

In the printing apparatus 1001 according to the third embodiment, the storage variables i of the current provisional delimiter candidate corresponds to the order number of the delimiter candidate which has been reordered based on the first predetermined rule (the first priority order) (S1062, S1063), and the provisional delimiter candidate is selected (S1063) and changed (S1058) via the storage variable i of the current provisional delimiter candidate. Therefore, the provisional delimiter candidate is selected (S1063) and changed (S1058) according to the first priority order which is obtained based on the first predetermined rule with respect to the received data 1051. Accordingly, since a provisional delimiter candidate is selected and changed from the delimiter candidates according to an appropriate order (S1063, S1058), priority is applied to the template 1040 (that is the print preview 1061), where the received data 1051 is appropriately input, so as to be displayed on the LCD 1023 (S1054). This reduces time and the work area of the RAM 1015 required for displaying the appropriate print preview.

In the printing apparatus 1001 according to the third embodiment, the number of template candidates obtained with the pick up method is limited to thirty (S1082). The storage variables j of the current provisional template candidate corresponds to the order number of template candidate which has been reordered based on the second predetermined rule (the second priority order) (S1083, S1084), and the provisional template candidate is selected (S1084) and changed (S1058) via the storage variable j of the current provisional template candidate. Therefore, the provisional template candidate is selected (S1084) and changed (S1058) according to the second priority order which is obtained based on the second predetermined rule with respect to the received data 1051. Accordingly, since a provisional template candidate is selected and changed from the template candidates according to an appropriate order (S1084, S1058), priority is applied to the template 1040 (that is the print preview 1061), where the received data 1051 is appropriately input, so as to be displayed on the LCD 1023 (S1054). This reduces time and the work area of the RAM 1015 required for displaying the appropriate print preview.

In the printing apparatus 1001 according to the third embodiment, a candidate for the number of item data in the received data 1051 from the host apparatus 1039 is provisionally determined based on the delimiter candidate which is specified by the storage variable i of the current provisional delimiter candidate (S1081), and only the template 1040 having the same number of input items as the provisional candidate for the number of input data is obtained as a template candidate (S1082). Accordingly, this provides better effects.

In the printing apparatus 1001 according to the third embodiment, the received data 1051 from the host apparatus 1039 is comprised of item data, a delimiter and print start data. Even if the printing apparatus 1001 receives the received data 1051 without print start data from the host apparatus 1039, the above described effects can be obtained due to each determination process of step S1042 in FIG. 16 and steps S1303 and S1304 in FIG. 23.

When the printing apparatus 1001 receives the received data 1051 without print start data from the host apparatus 1039, the data analysis process of step S1043 is executed in a condition that the variable y representing the number of print star data candidates is "0".

In this case, in the printing apparatus 1001 according to the third embodiment, after imaginary print start data is added at the end of the received data 1051 from the host apparatus 1039, the main program and other processes may be executed or the processes related to the print start data may be omitted from the main program and other processes and the print data may be produced based on the provisional candidates for a delimiter or a template. In this case also, the above-described effects can be obtained.

In the printing apparatus 1001 according to the third embodiment, the storage variables k of the current provisional print start data candidate corresponds to the order number of the print start data candidate which has been stored in the RAM 1015 based on the third predetermined rule (the third priority order) (S1071, S1072), and the provisional print start data candidate is selected (S1072) and changed (S1058) via the storage variable k of the current provisional print start data candidate. Therefore, the provisional print start data candidate is selected (S1072) and changed (S1058) according to the third priority order which is obtained based on the third predetermined rule with respect to the received data 1051. Accordingly, since a provisional print start data candidate is selected and changed from the template candidates according to an appropriate order (S1072, S1058), priority is applied to the template 1040 (that is the print preview 1061), where the received data 1051 is appropriately input, so as to be displayed on the LCD 1023 (S1054). This reduces time and the work area of the RAM 1015 required for displaying the appropriate print preview.

[Other Modifications]

While the presently exemplary embodiment has been shown and described, it is to be understood that this disclosure is for the purpose of illustration and that various changes and modifications may be made without departing from the scope of the disclosure as set forth in the appended claims.

For example, in the printing apparatus 1001 according to the third embodiment, the number of character strings which are searched as the delimiter candidates in step S1061 may be limited or the number of print start data candidates which are searched in step S1071 may be limited. Similar to the case where the number of obtained template candidates is limited to thirty (S1082), this limitation reduces time and the work area of the RAM 1015 required for displaying the template 1040 (that is the appropriate print preview 1061) where the received data 1051 is appropriately input on the LCD 1023.

In the printing apparatus 1001 of the third embodiment, in step S1056 of the data analysis process of FIG. 17, if it is determined that the operation key 1021 depressed in step S1055 is the OK key (S1056: YES), the print image which is developed in the print buffer 1016 may be printed on the print tape 1052 instead of executing step S1060. In this case, the template 1040 where the received data 1051 is appropriately input to each of the input items can be printed on the print tape 1052. Further, the processes relating to the mode in the main program of FIG. 14 (S1005, S1006) can be omitted.

In the printing apparatus 1001 of the third embodiment, the item data, a delimiter and print start data included in the data 1051 received from the host apparatus 1039 may be comprised of data having different kinds. Specifically, in the received data 1051 of "A1BC2DEF34 GHIJCR", the item data ("A", "BC", "DEF" and "GHIJ") is comprised of alphabets and the delimiters ("1", "2", "3" and "4") are comprised of numbers and the print start data ("CR") is comprised of a control code of an ASCII code. In this case of example, it can be recognized that no item data is between the delimiters "3" and "4". It can be also recognized that no item data is after the delimiter "3" from the item data after the delimiter "3". By comprising item data, a delimiter and print start data of data having different kinds, item data, a delimiter and print start data can be distinguished from each other precisely and a distinguishing process becomes simplified. The number of candidates for each of a delimiter and print start data or the number of candidates for both of them can likely be reduced compared to a case where a kind of item data, a delimiter and print start data is unknown or comprised of same kind of data. Or, one candidate for each of a delimiter and print start data can likely be determined, that is, a combination of item data, a delimiter and print start data is likely to be determined.

While the presently exemplary embodiment has been shown and described, it is to be understood that this disclosure is for the purpose of illustration and that various changes and modification may be made without departing from the scope of the disclosure as set forth in the appended claims.

What is claimed is:

1. A printing apparatus comprising:
   a template storing device that stores a plurality of templates; a receiving device that receives received data; a printing device that prints print data which is produced by inputting the received data to one of the plurality of templates; and a displaying device that displays a print image of the print data; and
   wherein the printing device prints received data including object print data and transmitted from an external device on a printing medium, wherein the template storing device stores template data where object print image which is produced based on the object print data are defined as a plurality of printing areas and where a position and a size of the printing area on the printing medium is defined as attribute information with respect to each printing area, the printing apparatus further comprising: a print control device that locates the object print data comprising the received data in the printing area according to the template data and controls the printing device to perform a printing operation; a preview data producing device that produces a plurality of preview data where the object print image corresponding to the object print data included in the received data is located in each printing area which is defined in the template data; a selecting device that selects one of a plurality of preview data produced by the preview data producing device displayed on the displaying device; and a print pattern setting device that sets an arrangement pattern of the object print data with respect to the template data according to the preview data selected by the selecting device.

2. The printing apparatus according to claim 1, wherein the template data includes attribute information with respect to each printing area, the attribute information representing a kind of the object print image which is to be located in the printing area, the printing apparatus further comprising: a determining device that determines whether the object print data can be printed in the printing area based on the attribute information of the printing area defined in the template data and the object print data included in the received data; and a display control device that displays on the display device only preview data that is determined that all the object print data can be printed in the printing areas by the determining device.

3. The printing apparatus according to claim 2, wherein the determining device determines that the object print data cannot be printed in the printing area when a part of the object print data is located outside of the printing area of the template data.

4. The printing apparatus according to claim 2, wherein the determining device determines that the object print data cannot be printed in the printing area when the object print image cannot be produced based on the object print data.

5. The printing apparatus according to claim 4, wherein when the object print data is bar code data and the bar code data include an error, the determining device determines that the bar code data cannot be printed in the printing area.

6. The printing apparatus according to claim 1, further comprising a mode changing device that switches a mode between a printing mode and a print pattern setting mode, wherein in the printing mode, when receiving the received data, the object print data is located in each printing area defined in the template data based on the print pattern data set by the print pattern setting device and the printing device performs a printing operation based on the received data and the template data, wherein in the print pattern setting mode, when receiving the received data, the preview data producing device produces preview data and the display device displays the produced preview data, and the print pattern setting device sets the print pattern corresponding to the preview data selected by the selecting device to the template data.

7. A printing apparatus comprising:
a template storing device that stores a plurality of templates; a receiving device that receives received data: a printing device that prints print data which is produced by inputting the received data to one of the plurality of templates; and a displaying device that displays a print image of the print data; and
wherein the printing apparatus further comprises:
a print pattern setting apparatus, wherein the print pattern setting apparatus includes: a transmission device that is connected to the printing apparatus and an external device which transmits received data including object print data which is printed by the printing apparatus and transmits data; a template storing device stores template data where object print image which is produced based on the object print data are defined as a plurality of printing areas and where a position and a size of the printing area on the printing medium is defined as attribute information with respect to each printing area; a print pattern setting device that sets an arrangement pattern of the object print data with respect to each printing area based on the template data and the received data; a preview data producing device that produces a plurality of preview data where the object print image corresponding to the object print data included in the received data is located in each printing area which is defined in the template data; a displaying device that displays a plurality of preview data produced by the preview data producing device; and a selecting device that selects one of a plurality of preview data displayed on the displaying device, wherein the print pattern setting device sets an arrangement pattern of the object print data with respect to the template data based on the preview data selected by the selecting device.

8. The printing apparatus according to claim 7, wherein the template data includes attribute information with respect to each printing area, the attribute information representing a kind of object print image which is to be located in the printing area, wherein the print pattern setting apparatus includes: a determining device that determines whether the object print data can be printed in the printing area based on the attribute information of the printing area defined in the template data and the object print data included in the received data; and a display control device that displays on the display device only preview data that is determined that all the object print data can be printed in the printing areas by the determining device.

9. A printing apparatus comprising:
a template storing device that stores a plurality of templates; a receiving device that receives received data; a printing device that prints print data which is produced by inputting the received data to one of the plurality of templates; and a displaying device that displays a print image of the print data; and
wherein the template storing device stores a plurality of templates including a plurality of input items, wherein the received data received by the receiving device includes item data, a delimiter and print start data, the printing apparatus further comprising a determining device that determines the print data, wherein the determining device including: a delimiter candidate obtaining device that obtains one candidate or a plurality of candidates for a delimiter based on a character string which is periodically repeated in the received data; a provisional delimiter candidate selecting device that selects one of the delimiter candidates as a provisional delimiter candidate; a number of item data provisionally determining device that provisionally determines a candidate for the number of item data in the received data based on the provisional delimiter candidate and the received data; a template candidate obtaining device that obtains one candidate or a plurality of candidates for a template based on the candidate for the number of item data which is provisionally determined by the number of item data provisionally determining device and each number of input item of the plurality of templates; a provisional template candidate selecting device that selects one of the template candidates as a provisional template candidate; a print data producing device that produces the print data by inputting the received data to the provisional template candidate; a provisional candidate changing device that changes one of the provisional delimiter candidate and the provisional template candidate into another candidate; and a provisional candidate determining device that determines each of the provisional delimiter candidate and the provisional template candidate.

10. The printing apparatus according to claim 9, wherein the determining device including: a print start data candidate obtaining device that obtains one candidate or a plurality of candidates for print start data based on the provisional delimiter candidate and the received data; and a provisional print start data candidate selecting device that selects one of the print start data candidates as a provisional print start data candidate, wherein the provisional candidate changing device changes the provisional print start data candidate into another candidate, and the provisional candidate determining device determines the provisional print start data candidate as the print start data.

11. The printing apparatus according to claim 10, wherein the print data producing device produces the print data by inputting the received data to the provisional template candidate based on the provisional candidates for a delimiter, a template and print start data.

12. The printing apparatus according to claim 11, wherein the number of print start data candidates obtained by the print start data candidate obtaining device is limited to a third predetermined number, and wherein the provisional print start data selecting device selects the provisional print start data candidate and the provisional candidate changing device changes the provisional print start data candidate according to a third priority order which is obtained based on a third predetermined rule with respect to the received data.

13. The printing apparatus according to claim 12, wherein according to the third priority order, priority is applied to a shorter control character string.

14. The printing apparatus according to claim 12, wherein according to the third priority order, priority is applied to a shorter control character string to a shorter symbol character string.

15. The printing apparatus according to claim 9, wherein the print data producing device produces the print data by inputting the received data to the provisional template candidate based on the provisional candidates for a delimiter and a template.

16. The printing apparatus according to claim 9, further comprising a mode switching device that switches the mode between on and off, wherein the determining device is operated when the mode is on.

17. The printing apparatus according to claim 9, wherein the number of delimiter candidates obtained by the delimiter candidate obtaining device is limited to a first predetermined number, and wherein the provisional delimiter selecting device selects the provisional delimiter candidate and the provisional candidate changing device changes the provisional delimiter candidate according to a first priority order which is obtained based on a first predetermined rule with respect to the received data.

18. The printing apparatus according to claim 17, wherein according to the first priority order, priority is applied to a shorter control character string.

19. The printing apparatus according to claim 17, wherein according to the first priority order, priority is applied to a shorter control character string or a shorter symbol character string.

20. The printing apparatus according to claim 17, wherein the number of template candidates obtained by the template candidate obtaining device is limited to a second predetermined number, and wherein the provisional template selecting device selects the provisional template candidate and the provisional candidate changing device changes the provisional template candidate according to a second priority order which is obtained based on a second predetermined rule with respect to the received data.

21. The printing apparatus according to claim 20, wherein according to the second priority order, the template candidates obtained by the template candidate obtaining device are limited to or priority is applied to the template candidates where a kind of characters input to each input item as default data is same as a kind of characters of each input data which is assumed by dividing the received data by the provisional delimiter candidate.

22. The printing apparatus according to claim 20, wherein according to the second priority order, the template candidates obtained by the template candidate obtaining device are limited to or priority is applied to the template candidates where the number of characters input to each input item as default data is same as the number of characters of each input data which is assumed by dividing the received data by the provisional delimiter candidate.

23. The printing apparatus according to claim 9, wherein the template candidate obtaining device obtains as the template candidates only templates having the same number of input items as the number of item data provisionally determined by the number of item data provisionally determining device.

* * * * *